(12) United States Patent
Connell, II et al.

(10) Patent No.: US 8,063,737 B2
(45) Date of Patent: Nov. 22, 2011

(54) EMERGENCY RESPONDER CREDENTIALING SYSTEM AND METHOD

(75) Inventors: Thomas W. Connell, II, Westminster, MA (US); Thomas W. Connell, Sr., Westminster, MA (US); Jason P. St. Amand, New Ipswich, NH (US)

(73) Assignee: WidePoint Corporation, Terrace, IL (US)

( * ) Notice: Subject to any disclaimer, the term of this patent is extended or adjusted under 35 U.S.C. 154(b) by 819 days.

(21) Appl. No.: 12/146,394

(22) Filed: Jun. 25, 2008

(65) Prior Publication Data

US 2008/0320572 A1    Dec. 25, 2008

Related U.S. Application Data

(60) Provisional application No. 60/945,997, filed on Jun. 25, 2007.

(51) Int. Cl.
| | |
|---|---|
| G05B 19/00 | (2006.01) |
| G05B 23/00 | (2006.01) |
| G06K 19/00 | (2006.01) |
| G08C 19/00 | (2006.01) |
| G06F 7/04 | (2006.01) |
| G06F 17/30 | (2006.01) |
| G06F 12/00 | (2006.01) |
| G06F 7/00 | (2006.01) |
| G06Q 10/00 | (2006.01) |

(52) U.S. Cl. ........ 340/5.81; 340/5.2; 340/5.74; 340/5.8; 726/6; 726/10; 726/18; 705/7.14

(58) Field of Classification Search ............ 340/5.2, 340/5.74, 5.8, 5.81; 726/6, 10, 18; 705/7.14
See application file for complete search history.

(56) References Cited

U.S. PATENT DOCUMENTS

| | | | |
|---|---|---|---|
| 5,369,702 | A | 11/1994 | Shanton |
| 5,369,707 | A | 11/1994 | Follendore, III |
| 5,375,169 | A | 12/1994 | Seheidt et al. |
| 5,680,452 | A | 10/1997 | Shanton |
| 5,787,173 | A | 7/1998 | Seheidt et al. |
| 5,898,781 | A | 4/1999 | Shanton |
| 6,229,445 | B1 | 5/2001 | Wack |
| 6,490,680 | B1 | 12/2002 | Scheidt et al. |
| 6,542,608 | B2 | 4/2003 | Scheidt et al. |
| 6,549,623 | B1 | 4/2003 | Scheidt et al. |
| 6,606,386 | B2 | 8/2003 | Scheidt et al. |
| 6,608,901 | B2 | 8/2003 | Scheidt et al. |
| 6,684,330 | B1 | 1/2004 | Wack et al. |
| 6,694,433 | B1 | 2/2004 | Kolouch |
| 6,754,820 | B1 | 6/2004 | Scheidt et al. |
| 6,845,453 | B2 | 1/2005 | Scheidt et al. |
| 7,016,495 | B2 | 3/2006 | Scheidt et al. |
| 7,079,653 | B2 | 7/2006 | Scheidt et al. |
| 7,089,417 | B2 | 8/2006 | Wack et al. |
| 7,095,852 | B2 | 8/2006 | Wack et al. |
| 7,111,173 | B1 | 9/2006 | Scheidt |

(Continued)

*Primary Examiner* — Jennifer Mehmood
*Assistant Examiner* — Andrew Bee
(74) *Attorney, Agent, or Firm* — Polsinelli Shughart PC

(57) ABSTRACT

A system for collecting, verifying, and managing identity data, skill data, qualification data, certification data, and licensure data of emergency responders. The system trusted verification of identity, skills, qualifications, certifications, and licensure, and disseminates information specific or related to identity, skills, qualifications, certifications, and licensure at the scene of an emergency. The system includes information collection devices, data storage media, information retrieval devices, and information management devices. The information collected, managed, and disseminated may include identity information, medical information, skills information, qualification information, certification information, licensure information. Data in the system is stored in multiple formats, allowing for the retrieval of trusted information in an environment that is part of a network or devoid of network connectivity.

14 Claims, 16 Drawing Sheets

U.S. PATENT DOCUMENTS

| | | |
|---|---|---|
| 7,131,009 B2 | 10/2006 | Scheidt et al. |
| 7,178,030 B2 | 2/2007 | Scheidt et al. |
| 7,212,632 B2 | 5/2007 | Scheidt et al. |
| 7,852,196 B1* | 12/2010 | Adams .......................... 340/5.86 |
| 2001/0051849 A1* | 12/2001 | Boone .......................... 701/201 |
| 2003/0156740 A1* | 8/2003 | Siegel et al. .................. 382/115 |
| 2004/0148186 A1* | 7/2004 | Kawashima et al. ............. 705/1 |
| 2007/0145121 A1* | 6/2007 | Dallal et al. .................. 235/380 |
| 2009/0189736 A1* | 7/2009 | Hayashi ....................... 340/5.81 |

* cited by examiner

ADMINISTRATIVE INPUT FORM

CANDIDATE DATA

First Name
Last Name
Administrative Role
Unique Identifier

SUBMIT

FIG. 6C

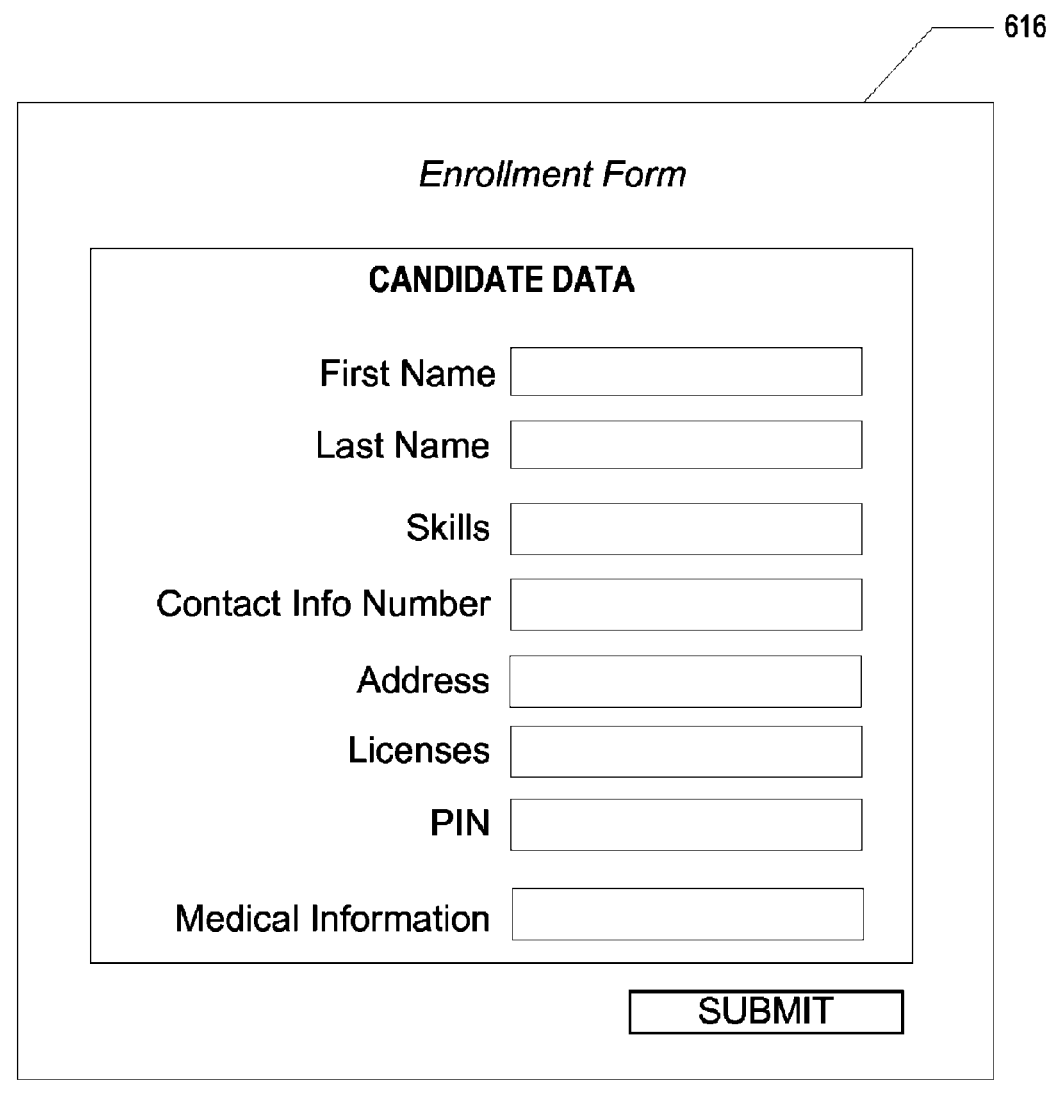

*Enrollment Form*

CANDIDATE DATA

First Name
Last Name
Skills
Contact Info Number
Address
Licenses
PIN
Medical Information

SUBMIT

616

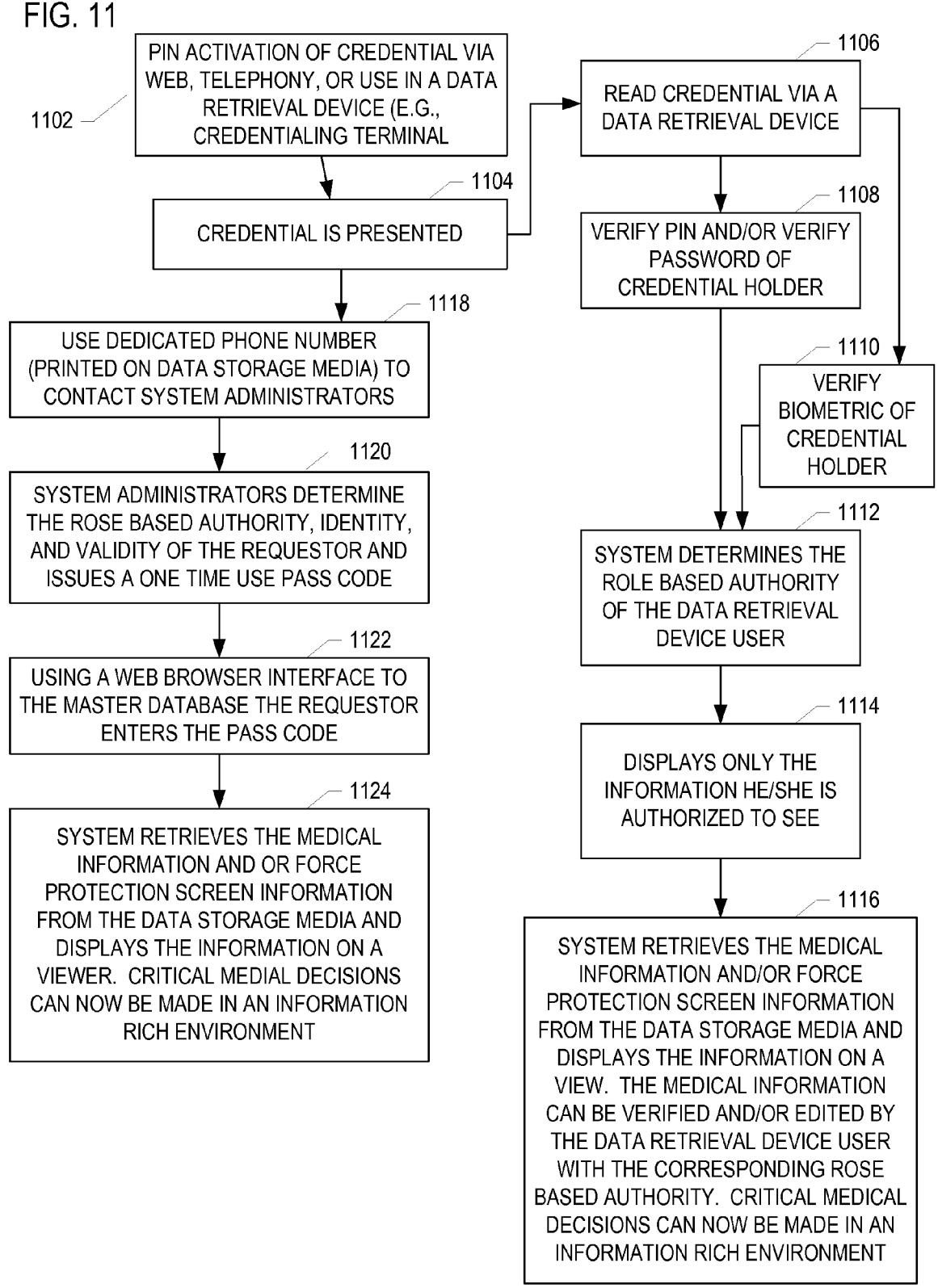

EMERGENCY RESPONDER CREDENTIALING SYSTEM AND METHOD

RELATED APPLICATIONS

This application claims priority to U.S. Provisional Application No. 60/945,997, entitled System and Method of Providing Trusted Information Regarding Emergency Responders, filed Jun. 25, 2007, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

Identity theft and fraud are substantial threats to informational security in today's technological age. As a result, governmental entities must be more and more vigilant in verifying the authenticity of documents being presented, for example, in procuring drivers' licenses and/or other public entitlements. Trust is the key to credentialing. People need to be able to trust the documents presented definitively.

The attacks on the United States of America on Sep. 11, 2001, prompted a review of how governmental entities identify those responding to an incident. For example, can the public trust that the fire fighter and police officer showing up on scene truly have the skills they say they do? How does Incident Command effectively keep unauthorized people from a disaster area, while at the same time account for the activities of authorized people?

In the years following the 2001 attacks, new federal guidelines and initiatives have been developed that have changed the way personnel are managed in disaster situations by laying out the specific procedures and checks to be done to trust the identification presented in a crisis situation. This focus has been increased by the federal government's issuance of four major guidance documents including Homeland Security Presidential Directive ("HSPD-12"), Policy for a Common Identification Standard for Federal Employees and Contractors; Federal Information Processing Standard 201-1 ("FIPS 201"), Personal Identity Verification ("PIV") of Federal Employees and Contractors; and Department of Health and Human Services—Health Resources and Services Administration—Emergency Systems for Advance Registration of Volunteer Health Professionals ("ESAR-VHP") Program; Real ID Act of 2005 and subsequent 2007 Guidance from the Department of Homeland Security.

We have learned from other disasters that the term "responder" can encompass a variety of skill sets. For example, the assistance of telecommunications workers and heavy equipment operators became vital in recovering from the devastation caused by Hurricane Katrina. The lessons from the 2001 attacks, Hurricane Katrina, and other disasters indicate that significant improvements are needed in crisis management.

There exists a great deal of historic evidence supporting the need for development of an interoperable network of credentialing systems. It is important to point out the perceived requirement is to develop an interoperable network, and not to establish a federally sponsored, sole-sourced data store system.

Local, regional, and state authorities require an identification system to provide for the advanced and/or acute credentialing of first responders and critical personnel. Given the number of federal agencies working both independently and in concert to develop future standards for the early identification, registration, and credentialing of first responders, the Authority Having Jurisdiction ("AHJ") also desires the system be configurable to current needs as well as future state and federal requirements. The AHJ is the entity responsible for authenticating identity as well as authentication and validation of professional training and licensure information in the home region or geographic area with which the credentialing candidate is affiliated via his/her primary credentialing classification. The AHJ will determine the level of information necessary to meet for both security and operational requirements. The AHJ should be aware that their current local requirements might be superseded by state or federal regulations in the future. Failure to conform to these regulations may result in the disqualification of locally issued credentials by other regional authorities.

A fundamental truth is that the emergency services community is the most dedicated to its mission, yet with the same passion, is the most tradition-bound. Nowhere is this more noticeable than with the introduction of "technology." Although tremendous strides have been made over the last twenty years using technology to assist in supporting safer and more effective firefighters, law enforcement officers, EMS professionals etc., they still find themselves resistant to change when something new comes down the pike. One of the latest uses of technology concepts introduced over the last few years involves the push to introduce interoperable credentialing systems.

There exists a great deal of confusion as to what a credential actually is. It is actually easier to define what a credential is not. It is not simply a badge. A badge in its various forms is relatively easy to duplicate. Although it obviously identifies the owner, it offers no guarantees to the accuracy of that identification. This perception is also true in regards to systems for credentialing, resource allocation, and accountability supported by bar code technology including the modem version of that technology referred to as radio frequency identification (RFID). This technology is also easy to duplicate and does not provide for adequate security in relation to both the technology and the technology's ability to support a trusted process.

Government authorities at local, regional, and state levels can issue credentials. Also, large private sector institutions such as hospitals, or even professional associations can issue credentials. However, the credential does not give the credential holder the legal right to perform any action or act on any authority. The credential does offer verified, definitive proof of credential holder's identity, and a record of licenses granted to credential holder, and professional qualifications and/or training certifications that allow a credential holder (e.g., emergency responder) to perform his or her job.

SUMMARY

According to one aspect, a system is provided for collecting credentialing data for a plurality of agencies. Each of the plurality of agencies provides an emergency response service. The system comprises a data store configured to store credentialing data. The system also comprises a first computing device 110 configured to generate a data entry request in response to input from a first user. The system also comprises a second computing device configured to generate an enrollment data entry request in response to input from a second user. The system also comprises a third computing device comprising executable modules stored thereon. The executable modules comprise a UI module configured to generate a first input form for display via the first computing device in response to the data entry request. The UI module is also configured to generate a second input form for display via the second computing device in response to the enrollment data entry request. The executable modules also comprise a storage module configured to transfer first credentialing data included in a storage request received from the first computing device to the data store for storage. The executable modules also comprise a verification module configured to compare the first credentialing data to second credentialing data included in an enrollment request received from the second computing device to determine whether second user is eligible for enrollment. The verification module transfers the second credentialing data to the data store when the second user is determined to be an eligible user. The verification module deletes the second credentialing data when the second user is determined to be an ineligible user.

According to another aspect, a method is provided for collecting credentialing data for a plurality of agencies. Each of the plurality of agencies provides an emergency response service. The method comprises storing credentialing data via a data store. The method also comprises generating a data entry request at a first computing device in response to input from a first user. The method also comprises generating an enrollment data entry request at a second computing device in response to input from a second user. The method also comprises generating a first input form for display via the first computing device in response to the data entry request. The method also comprises generating a second input form for display via the second computing device in response to the enrollment request. The method also comprises receiving a storage request at the third computing device. The storage request comprises first credentialing data. The method also comprises receiving an enrollment request at the third computing device. The enrollment request comprises second credentialing data. The method also comprises comparing the first credentialing data to the second credentialing data to determine whether second user is eligible for enrollment. The method also comprises transferring the first credentialing data included in a storage request received from the first computing device to the data store for storage when the second user is determined to be an eligible user. The method also comprises deleting the second credentialing data when the second user is determined to be an ineligible user.

BRIEF DESCRIPTION OF THE DRAWINGS

FIGS. 6B and 6C are exemplary input forms.

FIGS. 10-11 are flow charts depicting the exemplary scenarios for using an issued credential.

DETAILED DESCRIPTION

The present invention provides a credentialing system 100 for collecting, verifying, and providing trusted credentialing data for emergency responders. Credentialing data may comprise, for example, information regarding identity, skills, qualifications, training certifications, licenses, and any other information useful in verifying the identity and/or accessing the capabilities of emergency responders.

According to one aspect, the credentialing system 100 is used at a site or sites determined by the AHJ to verify the identity and professional qualifications of emergency responders. The credentialing system 100 can also verify other optional profile information. Once verified, the credentialing system 100 issues a secure credential or token to responders that can be used by an AHJ of a particular operation to enable secure, efficient, and effective allocation of personnel resources in accordance with the needs of that particular operation.

Figure 1:
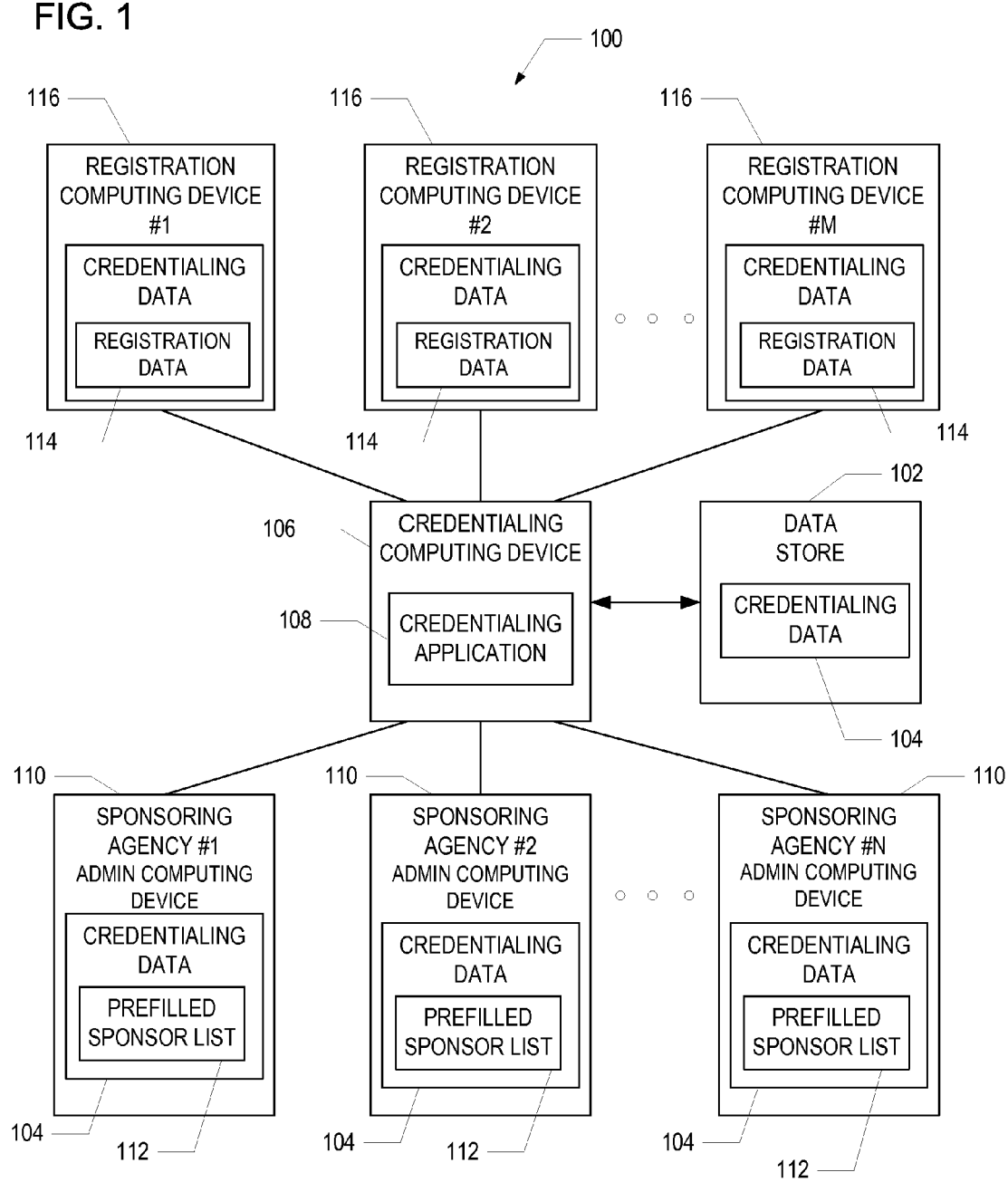
FIG. 1 is a block diagram of a credentialing system in accordance with an aspect of the present invention.

FIG. 1 is a block diagram depicting components of the credentialing system 100 according to one aspect of the invention. The credentialing system 100 comprises a data store 102 that is configured to store various types of credentialing data 104. More specifically, the data store 102 manages the storage of credentialing data 104 and enables authorized users of the credentialing system 100 to access the credentialing data 104. The functionality of the data store 102 is driven by a combination of preconfigured or "baseline" information and input from users and administrators. The data store 102 is, for example, a database management tool such as Microsoft® Access or any other structured query language (SQL) tool.

A credentialing computing device 106 is configured to execute a credentialing application 108 to collect credentialing data 104 for storage via the data store 102. The credentialing application 108 is also configured to provide authorized users access to stored credentialing data 104.

According to one aspect, the credentialing computing device 106 is configured to receive credentialing data 104 from administrative computing devices 110 used by one or more sponsoring agencies (e.g., sponsoring agencies 1-N). A sponsoring agency refers to a participating agency that provides a particular emergency response service. For example, a sponsoring agency may provide a fire fighting service, an ambulatory service, a policing service, etc. Notably, the sponsoring agency can also be the AHJ of a particular operation (e.g. scene of an emergency).

According to one aspect, participating agencies (e.g. sponsoring agencies I-N) are required to use a common administrative structure. For example, the participating agencies should assign authority to agency administrators in substantially the same manner. According to one aspect, administrative authority is assigned based on a hierarchal structure.

Figure 2:
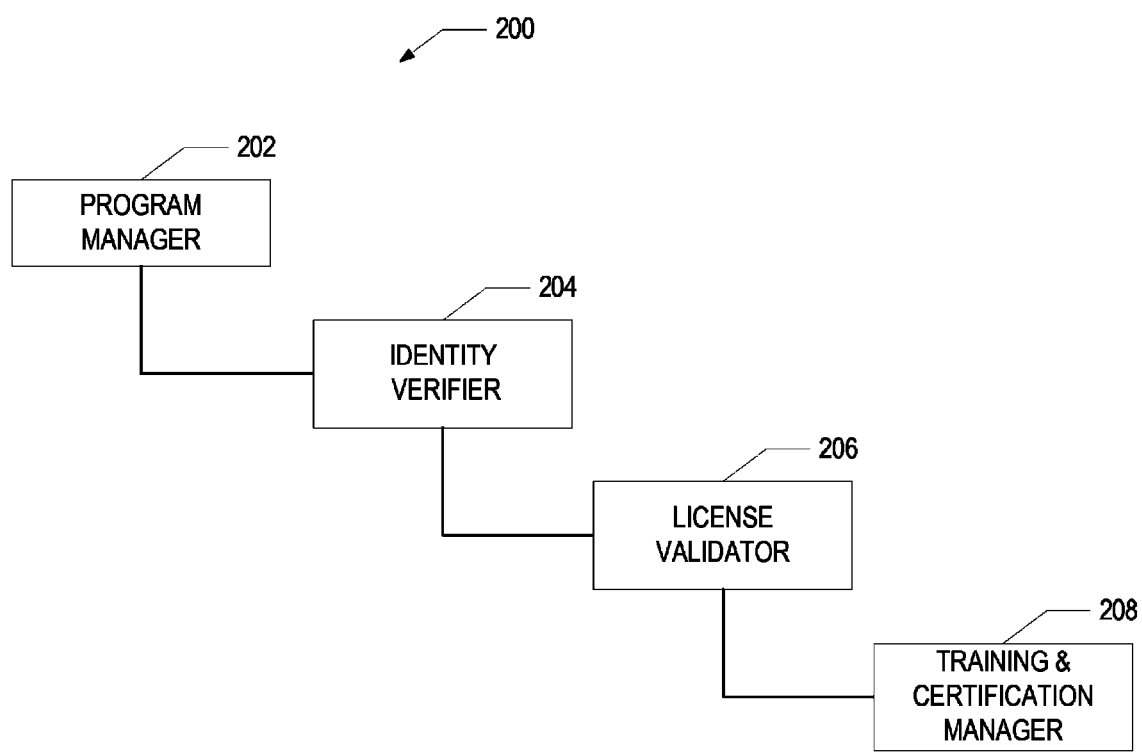
FIG. 2 depicts a hierarchal structure of an agency according to one aspect of the credentialing system.

FIG. 2 depicts a hierarchal structure 200 of participating agencies according to one aspect of the credentialing system 100. The hierarchal structure 200 is based on the particular role (authority level) of administrators or employees within the agency. Although the hierarchal structure of an agency can have various levels or administrative roles, the hierarchal structure is described herein as comprising at least four administrative roles. For example, according to one aspect, the administrative roles comprise an agency program manager at a first hierarchical level 202, an agency identity verifier at a second hierarchical level 204, an agency license validator at a fourth hierarchical level 206, and an agency skill and training certification manager at a third hierarchical level 208.

The Program Manager supervises projects within his or her agency or department and serves as the chief point of contact for that department or agency. The agency program manager can also fill any one of the remaining three administrative roles. The agency program manager uses a computing device 110 to enter and update credentialing data 104 in the data store 102 that is specific to the agency and common to all the agency's credential holders.

The Identity Verifier is an employee within the credentialed organization authorized that has been granted the appropriate administrative privileges to perform identity-proofing tasks. The Identity Verifier also has the responsibility and administrative authority to change the status of a credential from pending to active, to suspend a credential, and/or to revoke a credential. In addition, the Identity Verifier is responsible for safeguarding background check documents and results of such back-ground checks. The Identity Verifier uses the computing device 110 to record definitive proof of identification in the data store 102 for all agency employees and affiliates following specified requirements, such as Federal Form I-9 requirements. Notably, this individual should not be a Licensure Validator.

According to another aspect, the identity verifier uses universal operating rules to provide a "Trust Model." Conformity with such rules by the participating agencies contributes significantly to the "Level of Assurance" offered by any credential produced by the credentialing system 100.

Other level of assurance factors include the capture and electronic storage of the physical proof presented, proofing the identification and demographic data entered by the credentialing candidate during an enrollment or registration process, electronic identity checks through both primary source providers and third party information brokers, and the capture and electronic storage of biometric signatures (e.g. finger prints, DNA, etc.).

The Licensure Validator is an employee with the authority and appropriate administrative privileges to perform proofing of licensing credentialing data 104. For example, the Licensure Validator proofs the validation of professional and/or volunteer licensure, practicing privileges, and original and/or imported training records. The Licensure Validator also has the responsibility and administrative authority to change the status of a candidate from pending to active, to suspend, and/or to revoke a credential. The Licensure Validator uses the computing device 110 to record definitive proof of all professional licensure, such as license to practice medicine, DEA certification to prescribe pharmaceuticals, driver's, or CDL license, and license to carry firearms. According to one aspect, this individual should not be an Identity Verifier.

The Training and Certification Manager uses the computing device 110 to record all training and certification programs. For example, the Training and Certification Manager uses the credentialing system 100 to track certifications, mandatory refresher training, continuing education units ("CEU"), continuing medical education ("CME"), and risk management programs for employees of the agency. The information gathered and recorded by the Training and Certification Manager enables the credentialing system 100 to compare and report qualifications across jurisdictional boundaries and state boarders.

According to one aspect, in order to provide an interoperable environment, the data store 102 is configured to store training information (e.g. training guides or manuals) and training requirements for a plurality of agencies. According to one aspect, these system administrators monitor the national and/or state standards processes that impact on supported disciplines. Thereafter, the Training and Certification Manager uses the computing device 110 to update the data store 102 on a regular basis. As a result, the credentialing system 100 enables administrators of an agency to reduce the impact that such regulatory changes affect the agency's initial or in-service training programs.

Referring again to FIG. 1, according to one aspect, the credentialing data 104 provided by a particular sponsoring agency comprises a pre-filled sponsored list 112. The pre-filled sponsored list 112 includes a list of individuals that the sponsoring agency has authorized to enroll in the system 100. The credentialing data 104 provided by the participating agency (e.g., provided by an administrator with the appropriate authority) may also include specialty, skills, training status, identification data, and authentication data for emergency responders.

According to one aspect, a particular individual's (e.g., administrator) access to the credentialing data 104 can be restricted based on that individual's particular role, or hierarchal level. Although it is permissible for an administrator to hold multiple roles, in order to enhance the security of the credentialing data 104, there are circumstances where a single administrator should not hold specific combinations of certain roles. For example, a single individual should not hold both the Identity Verifier and Licensure Validator roles. According to one aspect, acceptable combinations of administrative roles comprise: "Program Manager and Identity Verifier," "Program Manager and Licensure Validator," and "Identity Verifier and Training and Certification Manager."

Although the credentialing application 108 is illustrated in FIG. 1, as a single application being executed by a single credentialing computing device 106, it is contemplated that each sponsoring agency can interact with a different credentialing computing device 108. Moreover, it is contemplated that such multiple credentialing computing devices 108 can be configured to communicate with each other via a communication network, such as the Internet.

According to one aspect, and as explained in more detail below in reference to FIG. 6A, the credentialing application 108 compares the information included in the pre-filled sponsored lists 112 to the registration data 114 submitted by the credentialing candidate via a registration computing device 116 to identify candidates that are not eligible to enroll in the credentialing system 100. Registration data 114 comprises, for example, the candidates name, residence address, mailing address, telephone numbers, candidate's skills, and any other personal, demographic, or descriptive information.

Comparing information included in the pre-filled sponsored lists 112 to registration data 114 is the first of a series of checks and balances used to prevent an individual(s) from deliberately defrauding the system and creating a false identity and subsequently a false credential. If the credentialing candidate is eligible for enrollment (i.e., an eligible candidate), the credentialing application 106 transfers the registration data 114 included the candidate's personal credentialing data 104 to the data store 102 for storage.

Creation of a credential is contingent on the establishment of a credentialing classification system. According to one aspect, the credentialing classification is determined through the association of attributes with the elements and sub-elements of an emergency response service offered by a sponsoring agency.

Figure 3:
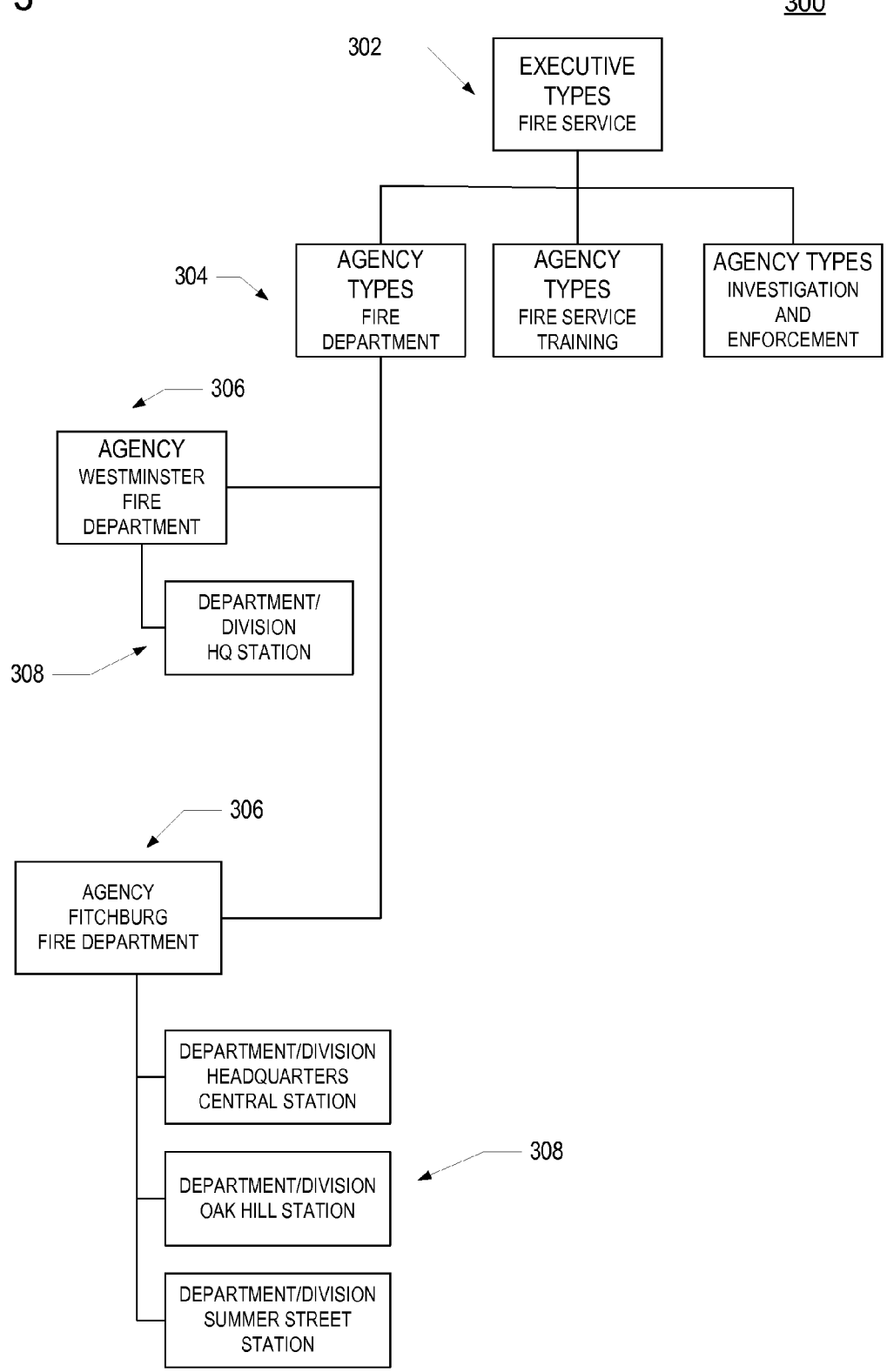
FIG. 3 depicts a classification hierarchal tree according to one aspect of the credentialing system.

FIG. 3 depicts a classification hierarchal tree 300 comprising four hierarchal levels consisting of both elements and attributes. The classification hierarchal tree 300 classifies an emergency response service offered by a particular agency into various levels.

Level one, as indicated by 302, consists of the attribute "Executive Types." The list of executive types are broad categories covering public service, such as "Fire Service" and "Law Enforcement", or private and commercial organizations such as "Commercial, Corporate" and "Non-Profit, Public Service."

Level two, as indicated by 304, consists of the attribute "Agency Type." An example of agency type under the executive type of "Fire Service" is "Fire Department." Another example of an "Agency Type" attribute of under the executive type of "Commercial, Corporate" is "Hospital" or "Government Contractor."

Level three, as indicated by 306, consists of the element "Agency." The "Agency" associated with the credentialing candidate is typically the sponsoring entity. An example of agency is the "Fitchburg Fire Department." The "Agency" element is associated with the credential holder as his/her "Credentialing Classification."

Level four, as indicated by reference character 308, consists of the sub-element "Department/Division." The Department/Division represents, for example, a physical location of the workplace assigned to the credentialing candidate. All elements and attributes may be preconfigured or user-driven and may have a one-to-one or a one-to-many relationships with the profile of the credential holder.

According to another aspect, it is important for sponsoring agencies to define skill sets. Ann issued credential will often have a set of skills associated with it. The skills are groups of elements associated with the "Executive Type" and "Agency Type" attributes. Grouping skills in this manner enables easier management of a credential holder's profile.

Figure 4A:
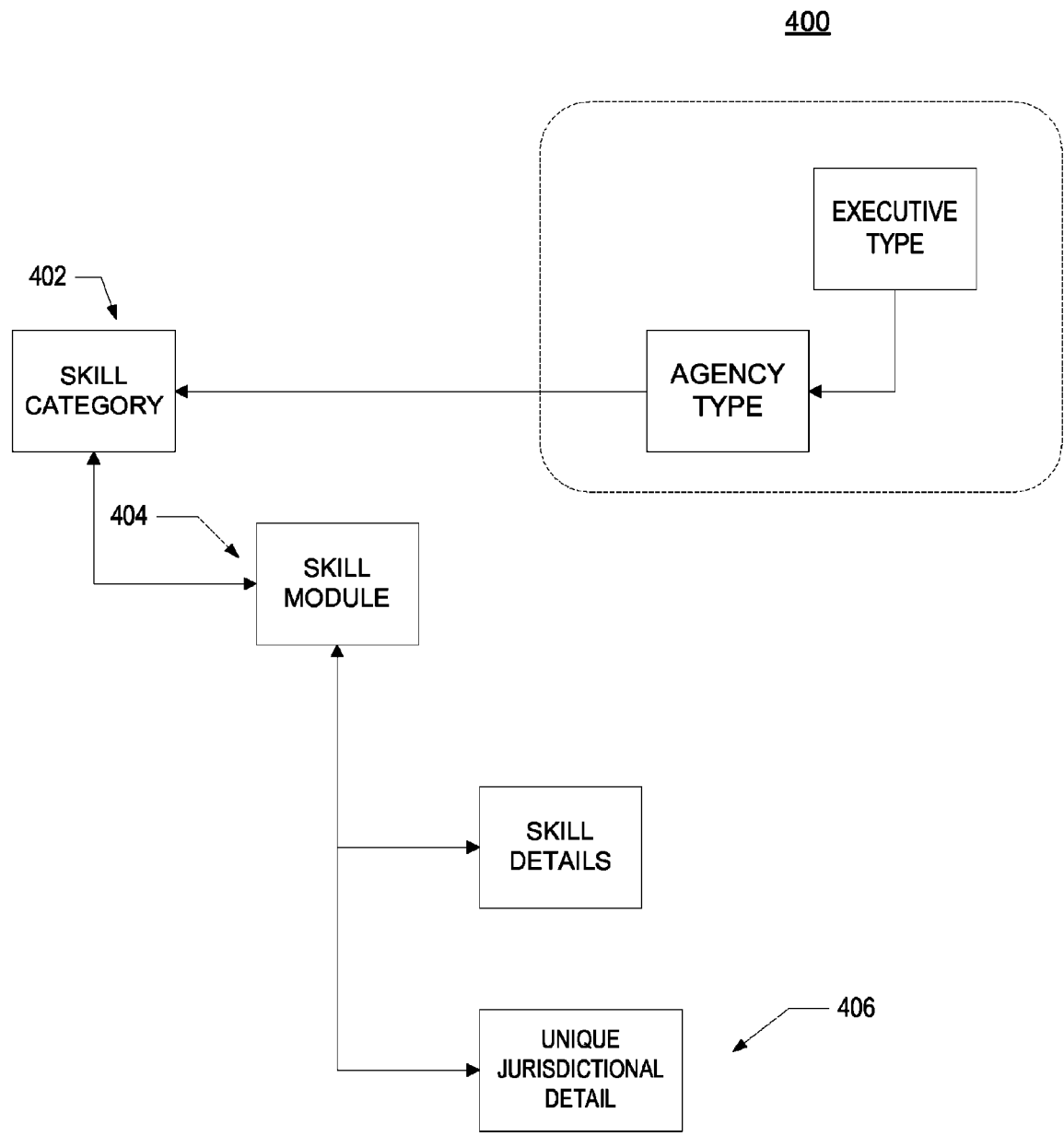
FIG. 4A depicts a skill hierarchal tree according to one aspect of the credentialing system.

FIG. 4A depicts a skill hierarchal tree 400 that comprises three hierarchal levels that correspond to the grouping of skill sets. Level one, as indicated by reference chart 402, corresponds to the Executive and Agency Type attributes describe above in reference to FIG. 3. Level one 402 is referred to as the Skill Category and can be defined broadly as a job or an assignment. An Example of a skill category is "Fire Fighter II." Fire Fighter II is a job with professional qualification standards promulgated by the National Fire Protection Association.

Each skill category has one or more sub-elements referred to as "Skill Modules." Skill Modules are found in level two, as indicated by reference character 404. Skill Modules can be broadly defined as a grouping of knowledge or performance based tasks of similar nature. For example, Skill Modules within the element "Fire Fighter II" may include "Fire Ground Operations" and "Rescue Operations." The Skill Modules allow for easy management of skill sets associated with a credential holder. "Skill Modules" also allow for the association of the sub-element(s) with the credential holder without necessitating association of the "Skill Category" element. Therefore, a portion of a training program can be associated with a credential holder before all the requirements of certification are met, which allows for increased effectiveness when searching for specific skills for allocating personnel resources at an emergency site.

Level three of the hierarchal tree 400, as indicated by reference character 406, corresponds to the sub-element "Skill Details." Skill Details can broadly be defined as specific knowledge elements and or tasks of a specific nature. For example, Skill Details under the Skill Module Fire Ground Operations are "Control flammable gas cylinder fire, acting as a member of a team" and "With a team, coordinate an interior attack line in a structure fire." The "Skill Details" essentially provides a definition of the skill and allows for easy management of skill sets associated with a credential holder. According to another aspect, the credentialing system 100 allows system administrators to define Unique Jurisdictional Details. Unique Jurisdictional Details are skill details, which are unique to a specific geographical location and are entered by end-users Skill Details also allow for the association of the sub-element(s) with the credential holder without necessitating association of the Skill Category element(s) or Skill Module sub-element(s). Therefore, a portion of a training program can be associated with a credential holder before all the requirements of certification are met, which allows for increased effectiveness when searching for specific skills for allocating personnel resources at an emergency site.

Figure 4B:
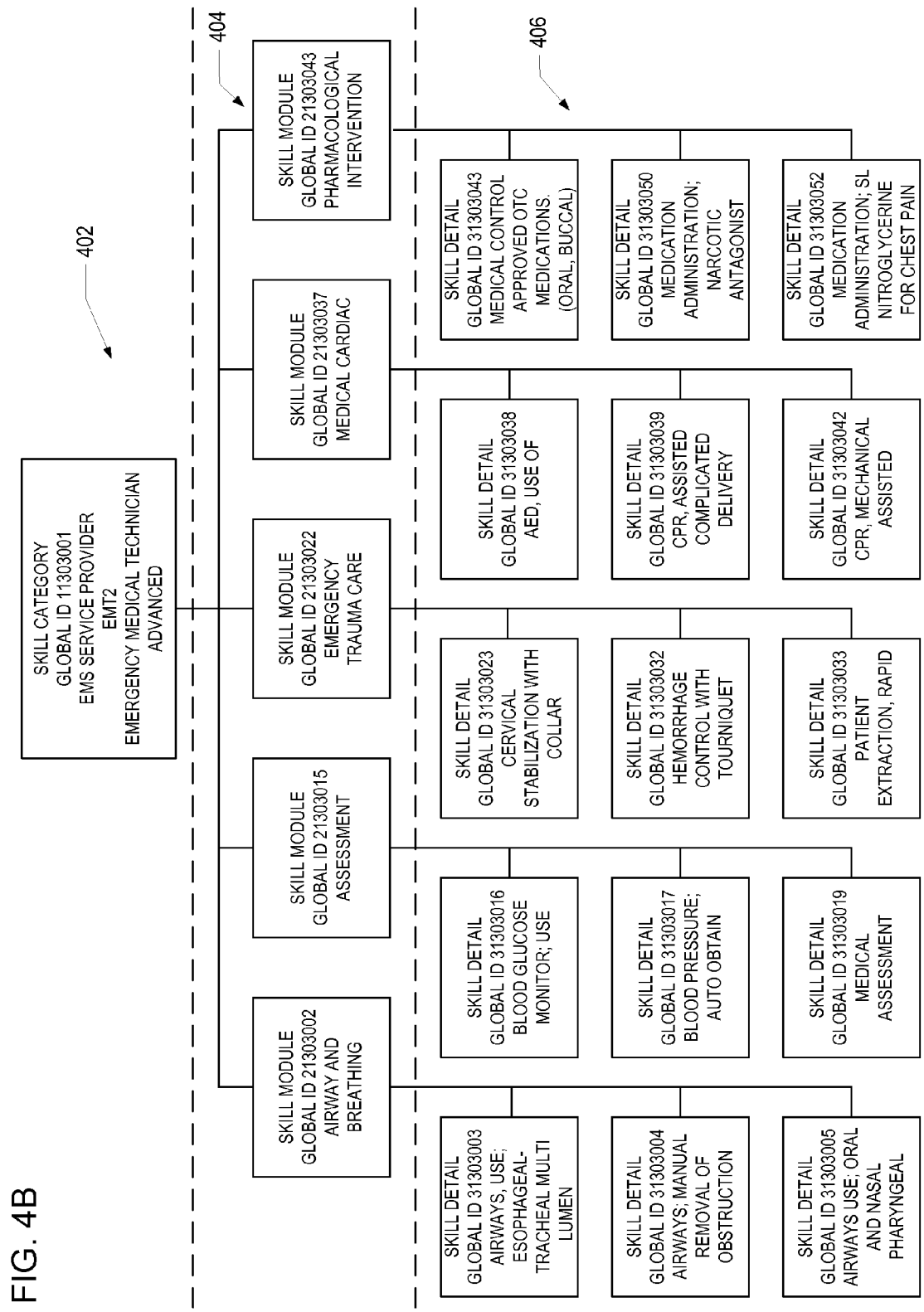
FIG. 4B depicts a categorization of skill sets for an emergency medical service provider.

Skill sets are essentially groupings of elements and sub-elements that can be derived and/or extracted from a number of sources. The methodology may vary but the outcome is consistent. For example, skill sets associated with the Executive Type of "Emergency Medical Services" may include the elements within baseline configuration of Skill Categories, Skill Modules, and Skill Details that have been extrapolated from all Emergency Medical Services Standards published by the U.S. Department of Transportation. Each standard may have information supporting multiple "Skill Categories." FIG. 4B depicts a partial breakdown and categorization for baseline skill set based on the Department of Transportation NHTSA standards for emergency medical service providers with corresponding global ID assignments.

As another example, the skill sets associated with the Executive Type of "Fire Service" may include elements within baseline configuration of Skill Categories, Skill Modules, and Skill Details that have been extrapolated from all Professional Qualifications Standards published by the National Fire Protection Association. Each standard may have information supporting multiple Skill Categories.

As another example, skill sets associated with the Executive Type of "Law Enforcement" may include elements within baseline configuration of Skill Categories, Skill Modules, and Skill Details that have been extrapolated from the training curriculum(s) of each major law enforcement training institution within grouping of or the totality of each state in the union. This data is analyzed at the skill detail level and the common requirements, knowledge base, and tasks are grouped in a matrix from which is derived a single standard including all of the elements common to law enforcement training. This matrix can be used to establish the baseline configuration. Each State definition file includes the unique jurisdictional skills identified in the extrapolation process. Each standard may have information supporting multiple "Skill Categories." This process will be followed until there is an adoption and/or requirements are defined for a National Law Enforcement Training Standard, at which point the methodology used in the "Fire Service" section will be adopted.

As another example, skill sets associated with the Executive Type of "Emergency Management" may include elements within baseline configuration of Skill Categories, Skill Modules, and Skill Details that have been extrapolated from the training curriculum(s) of the Federal Emergency Management Agency and Emergency Management Institute. This data is analyzed at the skill detail level, the common requirements, knowledge base, and tasks grouped by individual class or program. According to some aspects, the Skill Category is tagged with the label "supplemental skill," which identifies skills that do not fall under a single "job description."

The credentialing system 100 also enables system administrators to create skill sets that are not covered by a local state or national consensus standard, regulatory standard, or other commonly accepted document. Individuals within the agency that have been assigned the required role-based authority can create these skill sets. All elements and sub-elements created in this fashion are assigned a Global ID number with a state specific prefix. This prefix can be used by the credentialing system 100 to identify that the skill is a "Unique Jurisdictional Skill" and that the definition file of the state associated with the prefix must be referenced.

Figure 5:
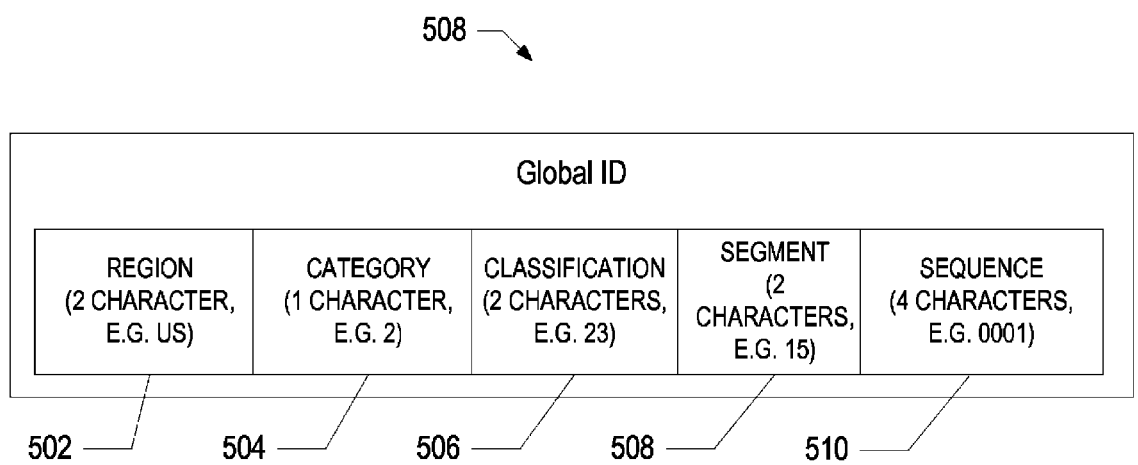
FIG. 5 depicts the structure of a global identification code (global ID) according to one aspect of the credentialing system.

FIG. 5 depicts the structure of a global identification code (global ID) 500 of a unique jurisdictional skill detail according to one aspect of the credentialing system 100. The global ID comprises five sections. Each section corresponds to a different skill parameter for a particular responder. For example, each section comprises one or more characters that identify a specific skill parameter.

A region section 502 comprises two characters and identifies the region for a skill. For example, the characters "US" identify national skill and the characters "MA" identify a state skill for Massachusetts.

A category section 504 comprises one character and defines the type of skill. For example, as explained above, there are four types of skills, which include skill category, skill module, skill detail, and unique jurisdictional. In this example, the values 1-4 correspond to skill category, skill module, skill detail, and unique jurisdictional, respectively.

A classification section 506 comprises two characters and identifies the type of skill that the global ID represents. For example, "10" identifies Fire Service skills.

A segment section 508 comprises two characters and identifies the specific section of the classification. For example, National Fire Protection Agency (NFPA) 1001 is a specific section under the Fire Service classification.

A segment number classification 510 comprises four characters and identifies the number that skill identifies within all identifiers.

Appendix A describes rules for assigning a global ID exemplary character values for the various sections of the global ID according to one aspect of the credentialing system 100.

Figure 6A:
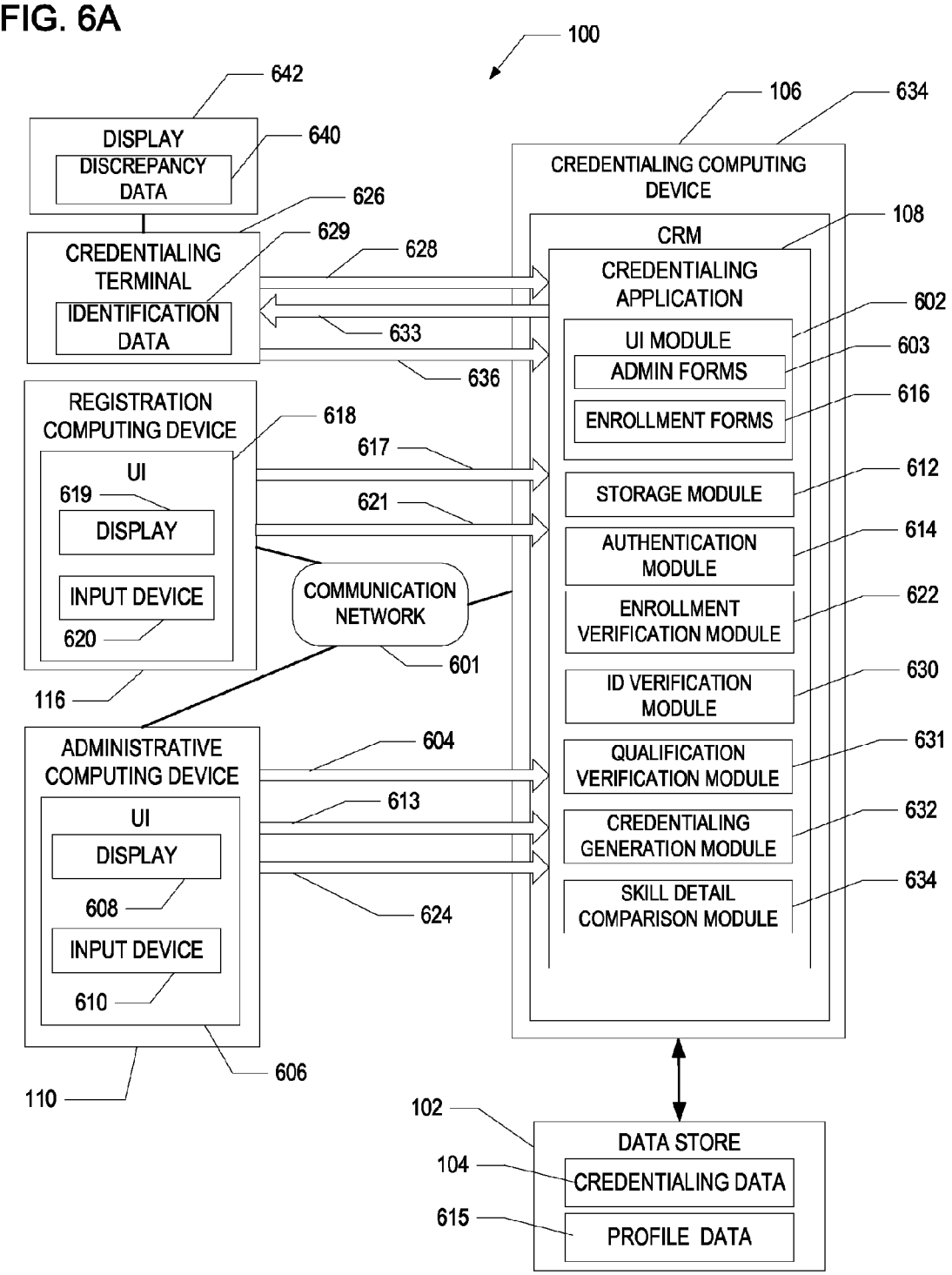
FIG. 6A is another block diagram of the credentialing system in accordance with an aspect of the present invention.

FIG. 6A is a block diagram that depicts modules of the credentialing application 108 according to one aspect of the credentialing system 100. The credentialing application 108 executes one or more of modules in response to requests generated via users of the administrative and/or registration computing devices 110 and 116.

According to one aspect, the registration computing device 116 and administrative computing device 110 are configured to communicate with the credentialing computing device 106 via a data communication network 601. In this example, the data communication network 601 may be the Internet (or the World Wide Web) that facilitates the transfer of data between the administrative and registration computing devices 110, 116 and the credentialing computing device 106. However, the teachings of the credentialing system 100 can be applied to any data communication network.

A UI module 602 generates one or more administrative input forms (admin forms) 603 for display in response to a data entry request, as indicated by 604, received from the administrative computing device 110. For example, the administrator uses a UI 606 to interact with, for example, a web browser via the computing device 110 to enter a network address, such as a web address, that identifies the location of a web page or electronic document configured to display one or more admin forms 603 to the administrator. In one example, the UI 606 comprises a display 608, such as a computer monitor, for viewing data and/or admin forms 603 and an input device 610, such as a keyboard or a pointing device (e.g., mouse, trackball, pen, touch pad, or other device), for allowing the administrator to interact with the admin form 603. For example, an administrator can select an option such as enter eligible emergency responders to define, update, or edit the pre-filled sponsored list 112.

Figure 6B:
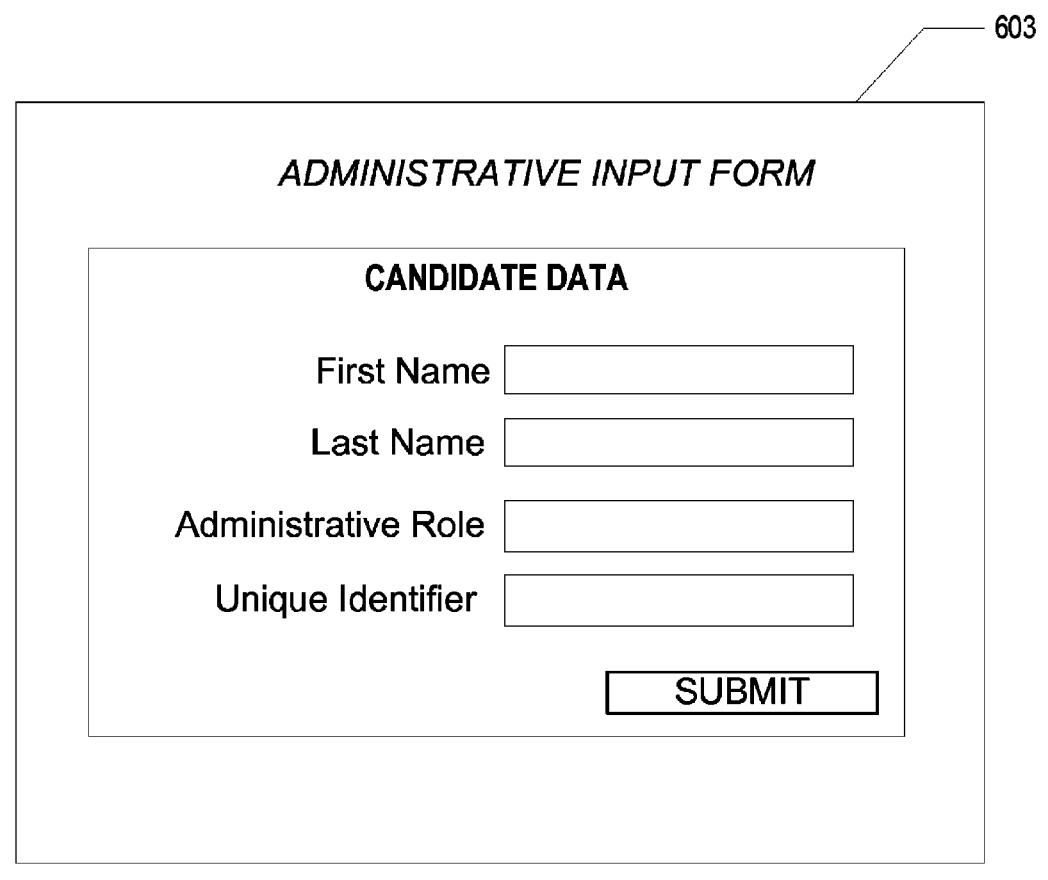

A storage module 612 stores credentialing data 104 in the data store 102 in response to a storage request, as indicated by 613, received from the administrative computing device 110. For example, the administrator uses the UI 606 to interact with admin form 603 displayed on the display 608 to define the pre-filled sponsored list. Thereafter, the administrator uses the input device 610 to select, for example, a "submit" control to generate the storage request 612. The storage request 612 comprises the pre-filled sponsored list. For purposes of illustration, an exemplary admin form 603 is depicted in FIG. 6B.

According to another aspect, an authentication module 614 authenticates the storage request 612 prior to storing credentialing data 104 in the data store 102. For example, the authentication module 614 compares authentication data received from the administrator via the administrative computing device to authorization data stored in the central data store. Alternatively, an authentication database (not shown) may be located on a separate computing device (i.e., not contained within computing device 108). Stored authentication data may include a password previously defined by the administrator and/or a user ID previously provided by the administrator and/or sponsoring agency. If user authentication data received from the administrative computing device 110 does not match authentication data stored in the data store 102, the user is not authenticated and denied access to the credentialing data 104. If the user authentication data received from the computing device 110 matches the authentication data stored in the data store 102, the administrative user is authenticated and allowed to store and manipulate credentialing data 104 stored in the data store 102.

As another example, the authentication module 614 retrieves administrator profile data (profile data) 615 via the data store 102 to verify that the administrator generating the storage request 612 has the appropriate authority (i.e., administrative role) to view, store, or update the credentialing data specified in the storage request. According to one aspect, each of the participating agencies must identify management team administrators and enroll the administrators in the credentialing system 100 using for example, the computing device 110. During enrollment of the agency administrators, administrator profile information for each administrator is provided to the credentialing system 100 for storage in the data store 102. The profile data 615 comprises, for example, the authority level and/or administrative role (e.g., Program Manager, Licensure Validator, Identity Verifier, and Training and Certification Manager).

According to another aspect, the profile data 615 comprises the services provided by participating agencies classified or categorized according to the classification hierarchal tree 300 described above in reference to FIG. 3. The profile data 615 may also comprise emergency responder skill sets classified or categorized according to the skill hierarchal tree 400 described above in reference to FIG. 4.

According to another aspect, the UI module 602 generates an enrollment form 616 for display via the registration computing device 116 in response to an enrollment data entry request, as indicated by 617. For purposes of illustration, an exemplary enrollment form 616 is depicted in FIG. 6C.

A credentialing candidate uses an UI 618 to interact with the enrollment form 616 to define personal credentialing data 104, such as registration data 114. In one example, the UI 618 comprises a display 619, such as a computer monitor, for viewing data and/or input forms and an input device 620, such as a keyboard or a pointing device (e.g., mouse, trackball, pen, touch pad, or other device), for allowing the user to interact with an input form.

The process of enrollment comprises self-reporting of information by the candidate (e.g., a particular emergency responder) that desires to be issued a credential. For example, the candidate interacts with a series of drop-down boxes to make selections that in concert create the credentialing classification discussed above. This information may comprise but is not limited to: Full legal name; maiden name (if applicable); legal physical address (including county and country); mailing address (if different); driver's license number; social security number; telephone number(s) by which the individual can be contacted. Additional descriptive, biographic, demographic, and personal information may also be collected.

According to one aspect, the registration data may also comprise personal authentication or identification data such as a personal identification number (PIN) and/or a password. According to one aspect, the PIN comprises at least four (4) numerals. The password may comprise, for example, three or four of the following characters: an upper case character, a lower case character, a special character, and a number.

Additionally, optional information supplied by the candidate during the enrollment process may comprise medical profile information, prescreening information for the purposes of prescribing medication, dependent medical profile and/or prescreening information for the purposes of prescribing medication, emergency contact information, spousal information, marriage status, dependent status, insurance information, or any other information set considered to be of value to the sponsoring agency and the strength of the credential. After the candidate has completed data entry via the enrollment form 616, the candidate selects, for example, a submit control to generate an enrollment request, as indicated by reference character 621.

An enrollment verification module 622 verifies that the candidate is eligible for enrollment in the credentialing system 100 in response to the enrollment request 621. For example, if credentialing data, such as a full name, submitted by the credentialing candidate does not match any of the information included in the pre-filled sponsored lists 112, the candidate is notified that he or she is ineligible to enroll and the supplied registration data is deleted. On the other hand, if the full name submitted by a credentialing candidate matches information included in the pre-filled sponsored lists, the registration is accepted, and the submitted information is stored via the data store 102.

According to another aspect, the enrollment verification module 622 is configured to periodically verify the eligibility of candidates to enroll in the credential system after the received credentialing data has been stored in the data store. For example, the enrollment verification module 622 executes daily (or any other predetermined time interval) to identify credentialing data received from individuals during the day that are ineligible for enrollment.

According to another aspect, the enrollment verification module 622 is configured to verify the eligibility of candidates to enroll in the credential system in response to a verification request received from the administrative computing device 110. For example, the administrator uses the administrative computing device 110 to generate a verification request, as indicated by reference character 624. The enrollment verification module 622 executes in response to a received verification request 624 to identify credentialing data that was received from individuals that are ineligible for enrollment in response to the received verification request. Thus, any record created by an individual that is not included in the pre-filled sponsor list 112 can be manually (e.g., by administrator) or automatically deleted from the credentialing system 100.

With the enrollment completed, the credentialing candidate presents him/herself to a receiving authority, (e.g., a representative of an authority having jurisdiction of a particular operation). The receiving authority uses a credentialing terminal or a verification tool 626 configured to interface with the data store 102 and/or a third-party information broker (not shown) via a communication network (e.g., communication network 601). The credentialing terminal 626 is also configured to generate a verification of identity request 628. Although the credentialing terminal 626 is depicted as a separate device, a sponsoring administrative computing device 110 may also operate as a credentialing terminal 626 according to other aspects of the invention.

An identity verification module 630 is executed in response to the verification of identity request 628 to verify the identity of the credentialing candidate as a function of personal identification data 629 included in the verification of identity request 628. For example, the candidate is required to enter his/her previously defined PIN and/or password via the credentialing terminal 626. The supplied PIN and/or password are compared to credentialing data 104 retrieved via the data store 102 to verify the identity of the candidate.

According to another aspect, the verification of identity request 628 comprises a biometric signature of the candidate that is compared to biometric data retrieved via the data store 102. The biometric signature may be input into the credentialing terminal 626 via biometric device (not shown), such as a biometric scanner (e.g., fingerprint or optical scanner).

A qualification verification module 631 is executed in response to a verified identity to verify the qualifications of the credentialing candidate as a function stored credentialing data 104. For example, the qualifications verification module 631 verifies that the candidate has the appropriate licensure and/or skills and training certifications.

As described in more detail below in reference to FIGS. 7-9, the identification ("ID") verification and qualification verification modules 630, 631 are configured to retrieve various types of credentialing data 104 or documentation from the data store 102 to verify the identity and/or skills and training certifications of the credential holder. For example, the retrieved credentialing data 104 can be identity documents, licensure documents, and/or training and skills certification documents.

A credential generation module 632 generates a credential generation request, as indicated by reference character 633, in response to the verified identify and qualifications of the credentialing candidate. According to one aspect, the credential terminal 626 is configured to generate the credential 650 for the candidate in response to the credential generation request 633. According to another aspect, the credential computing device 106 is configured to generate the credential 650 for the candidate in response to the credential generation request 633.

Figure 6D:
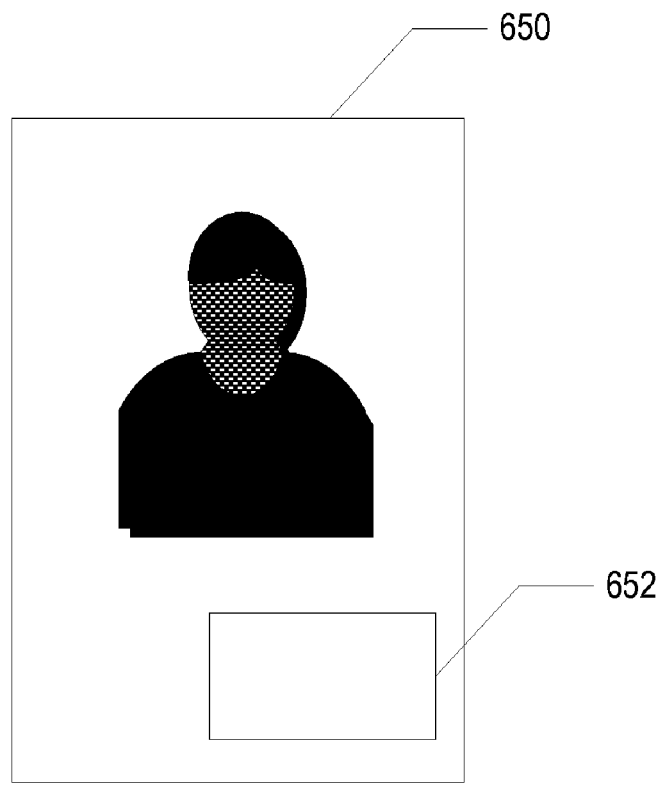
FIG. 6D depicts an exemplary issued credential.

FIG. 6D depicts a credential 650 issued in the form of a "smart card." A smart card 650 is a type of plastic card embedded with a computer chip or chips or any other storage media 652 that can store and/or transfer data. According to one aspect, the credential terminal 626 is configured to stored verified identity data and qualification data on the storage media 652 in response to the credential generation request 633. This data is associated with a value and/or information and is stored and/or processed within the card's microprocessor chip(s). For example, the data stored within the card's microprocessor can include global ID data. The identity data and qualification data can later be transacted via a reader that is part of a trusted computing system. Notably, the credentialing terminal 626 can also be used to collect data or read data from the storage media 652 of an issued credential.

Referring back to FIG. 6A, according to another aspect, the storage module 612 is configured to encrypt credentialing data being stored on the data store 102. For example, the credentialing data is encrypted using a cryptographic key management ("CKM") system or a digital certificate.

According to another aspect, a skill detail comparison module 634 is responsive to a skill comparison request, as indicated by reference character 636, to enable the receiving authority to identify discrepancies at the skill detail level between the skill details on record for the credential issuing authority and the skill details on record for the receiving authority. For example, the receiving authority uses a UI (not shown) associated with the credentialing terminal 626 to generate the skill comparison request 636.

Figure 6E:
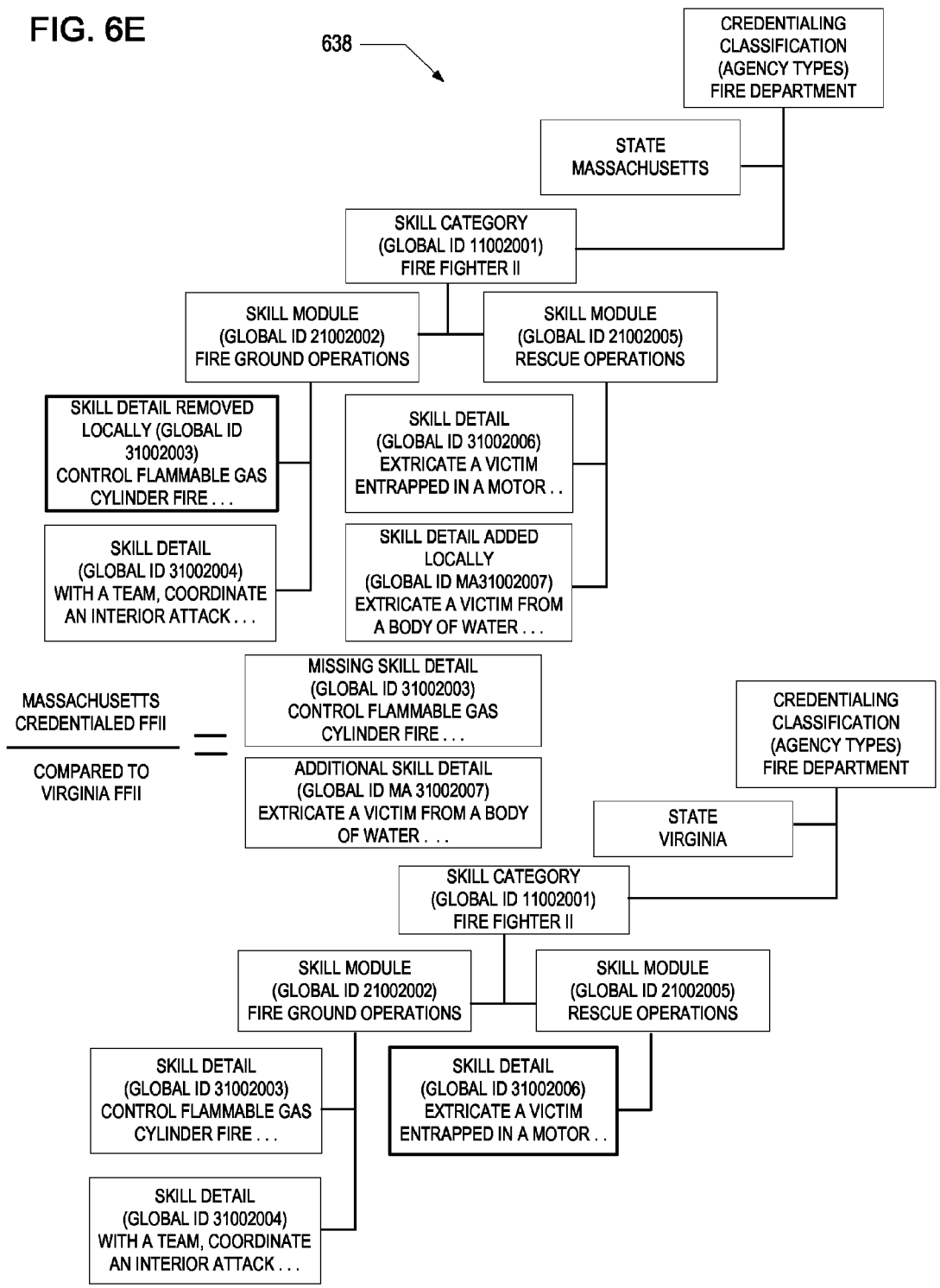
FIG. 6E illustrates the comparison between skill details of different jurisdictional authorities.

FIG. 6E depicts an exemplary comparison 638 between skill sets from different jurisdictions. In this example, the skill details of a credentialed Fire Fighter II from a first jurisdiction, such as Massachusetts, are compared to skill details for Fire Fighter II of a second jurisdiction, such as Virginia. In this example, the skill details of Fire Fighter II from Massachusetts include the additional skill detail "Extricate a victim from a body of water." However, the skill details of Fire Fighter II from Massachusetts no longer include the skill detail "Control flammable gas cylinder fire," because it was removed locally for some reason.

Referring back to FIG. 6A, according to another aspect, the skill detail comparison module 634 is configured to transfer identified discrepancy data 640 to a display 642 of the credentialing terminal 626 for display. As a result, the receiving authority can assign and/or allocate the resources proffered by the credential holder based on verified skill and certifications in conjunction with any identified discrepancies.

Figure 7:
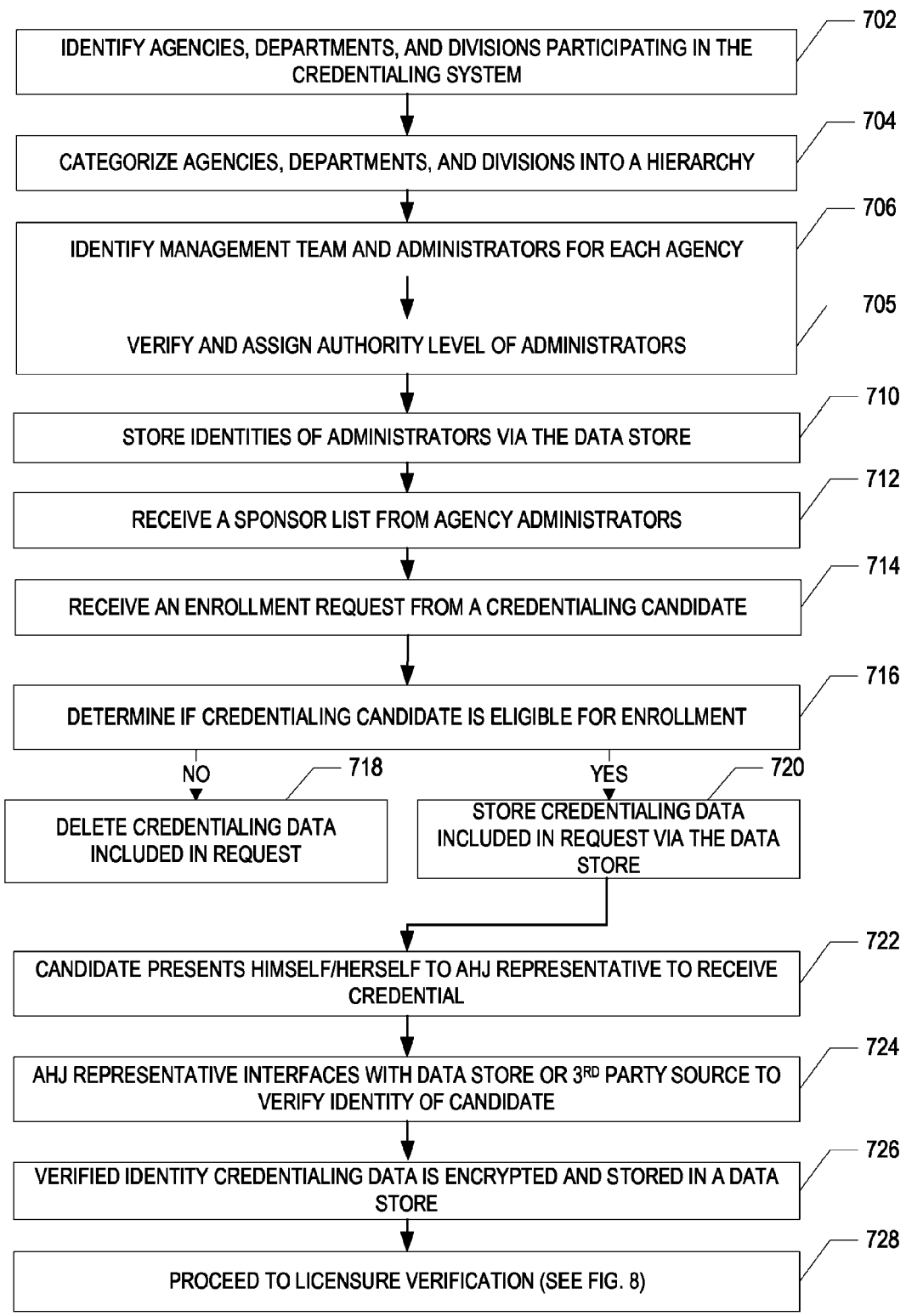
FIG. 7 is a flow chart illustrating a method for collecting and verifying identity and personal credentialing data via the credentialing system.

FIG. 7 illustrates a method for collecting and verifying identity and personal credentialing data 104 via the credentialing system 100. At 702, identify agencies, departments, and divisions participating in the credentialing system 100. Categorize the identified agencies, departments, and divisions into a hierarchal structure according to executive type and agency type at 704. At 706, identify management team and administrators for each agency. Verify and assign authority levels to administrators to be enrolled in the credentialing system 100 at 708.

At 710, store the identities of agency administrators via the data store 102. Receive a sponsor list from agency administrators at 712. As described above, the sponsor list (e.g., pre-filled sponsor list 112) includes a list of individuals that the sponsoring agency has authorized to enroll in the system 100. At 714, receive an enrollment request from a credentialing candidate. The enrollment request includes credentialing data from the candidate. The credentialing data may comprise personal information (e.g., contact information), descriptive information (e.g., physical appearance), biographical information (e.g., qualifications, training, etc.,), demographic information (e.g., state, city, etc.), and various types of medical information. Medical information may include medical profile information, force protection medical screening, and dependent force protection medical screening information. The enrollment request may also include authentication data such as a personal identification number (PIN) and password.

At 716, the credentialing data included in the enrollment request is compared to the stored sponsor list to determine if the candidate is eligible to enroll in the credentialing system. For example, candidate name information is compared to names in the stored sponsor list to determine if there is a match. If there is a match, the candidate is eligible to enroll. If there is not a match, the candidate is deemed ineligible for enrollment and the credentialing data included in the request is deleted at 718. If the candidate is deemed eligible for enrollment, the credentialing data supplied by the candidate is stored via the data store 102 at 720.

At 722, a credentialing candidate presents him/herself to a system administrator or AHJ representative to receive a credential. The system administrator uses a credentialing terminal 626 to interface with the data store 102 and/or a third-party information broker to verify the candidate's identity at 724. The various verification techniques are described above in reference to FIG. 6A. Optionally, at 726, the verified identity credentialing data is encrypted using a digital certificate or CKM for storage via the credentialing terminal. Proceed to licensure data collection verification.

Figure 8:
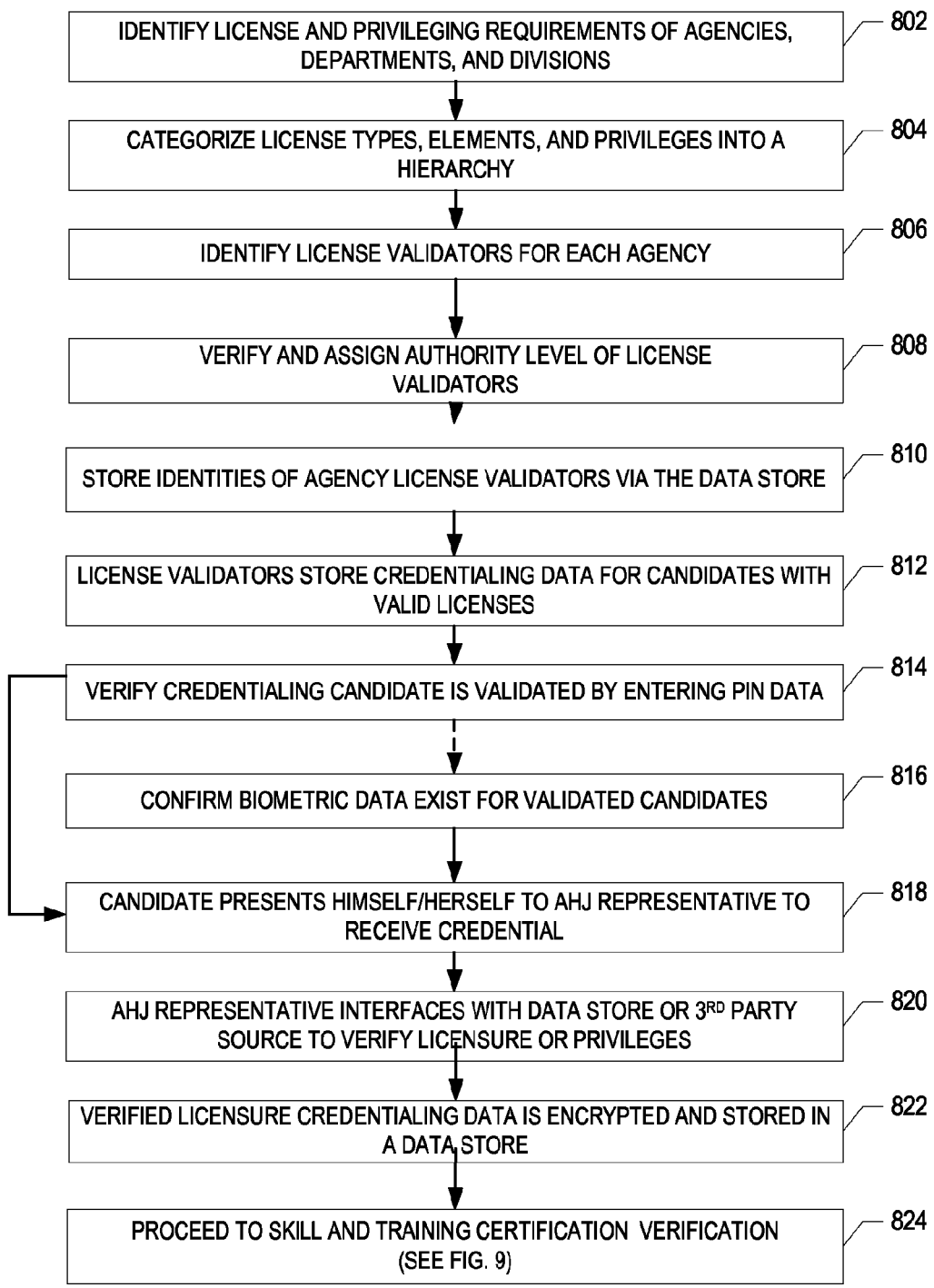
FIG. 8 is a flow chart illustrating a method for collecting and verifying licensure information via the credentialing system.

FIG. 8 illustrates a method for collecting and verifying licensure information 104 via the credentialing system 100. At 802, identify license and privileging requirements of the agencies, departments, and divisions participating in the credentialing system 100.

At 810, store the identities of agency license validators via the data store 102. The license validators identify and store credentialing data for candidates with valid licenses at 812. At 814, verify that the credentialing candidate is validated by, for example, entering the PIN of the candidate for storage via the data store 102. Optionally, at 816, confirm that biometric information exist for the candidate.

At 818, a credentialing candidate presents him/herself to a system administrator or AHJ representative to receive a credential for an operation that requires a license. The system administrator uses a credentialing terminal 626 interfaced to the data store 102 and/or a third-party information broker to conduct verification of the self-reported licensure or privileges at 820. Examples of self-reported license information may comprise a license to practice medicine, a medical board certification of a specialty or a sub-specialty, a certification to practice as pre-hospital care provider, or a license to carry a concealed weapon.

During the verification process, the credentialing candidate may supply his or her PIN, and/or optionally a biometric signature. Verification of the licensure and/or privileges may also include the following: capture of images of the breeder documents; visual comparison of data from the original breeder documents to information self-reported by the candidate; electronic comparison of the information in the breeder documents with the information self-reported by the candidate by means of optical character recognition; transfer of credentialing candidates information from the breeder documents and/or data store to a governmental authority, third-party information broker, or other information resource for the purpose of verifying that the licensure and/or privileges are valid and without encumbrance or restriction; and/or transfer of credentialing candidate's information from the breeder documents and/or data store to a governmental authority, third-party information broker, or other information resource for the purpose of verifying the licensure and/or privileges are associated with the identity of the credentialing candidate previously verified.

Optionally, the candidate's verified licensure information is encrypted using a digital certificate or CKM for storage via the credentialing terminal 1 at 822. Proceed to skills and training data collection and verification.

Figure 9:
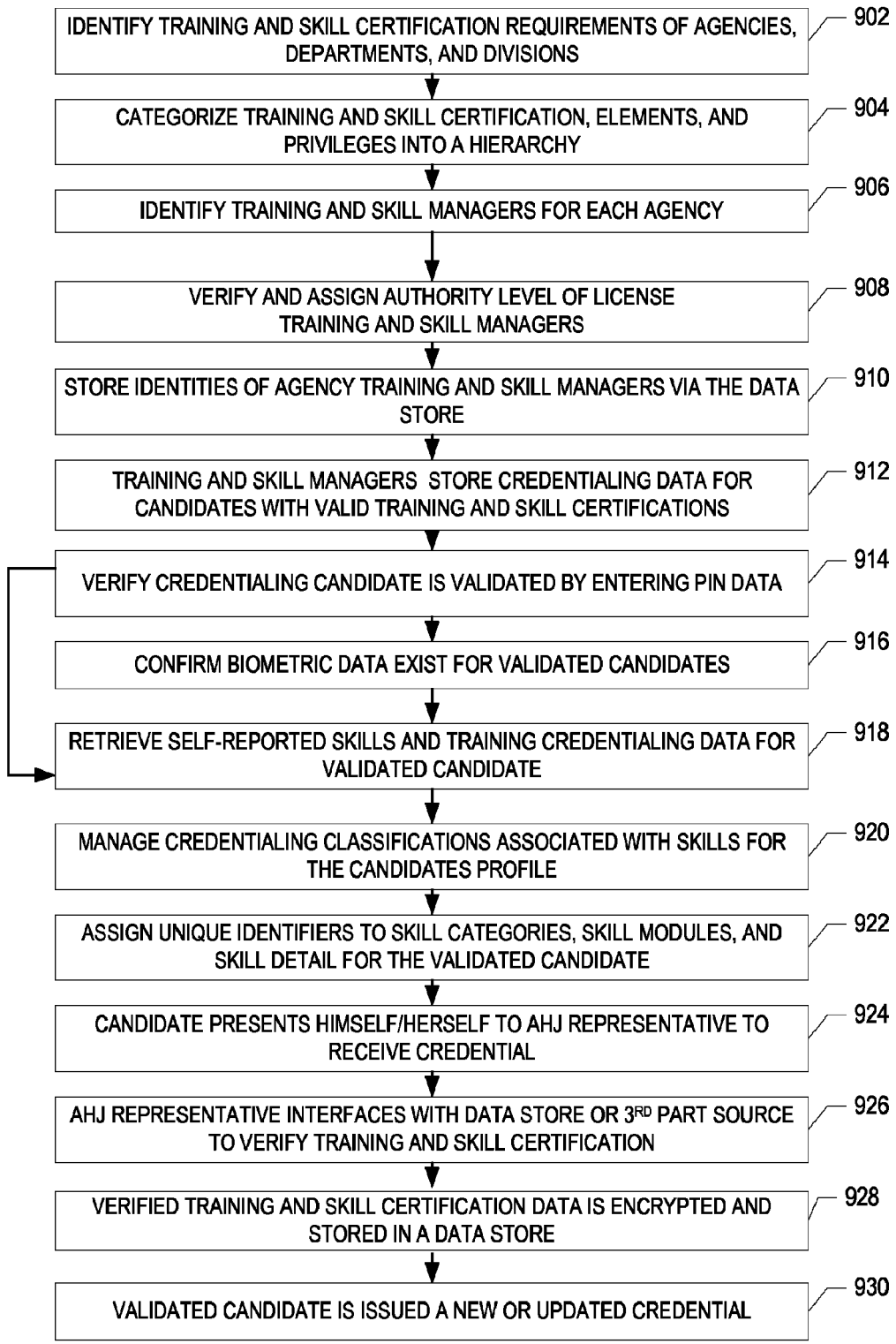
FIG. 9 is a flow chart illustrating a method for collecting and verifying training and skill certifications information via the credentialing system.

FIG. 9 illustrates a method for collecting and verifying training and skill certifications information via the credentialing system 100. At 902, identify the training and skill certifications requirements of agencies, departments, and divisions participating in the credentialing system 100. Categorize training and skill certification elements including skill categories, skill modules, and skill details into a hierarchy according to regional, county, state, and federal guidelines at 904. At 906, identify skill and training mangers for each agency. Verify and assign authority levels of skill and training mangers to be enrolled in the system at 908.

At 910, store the identities of skill and training mangers via the data store 102. The skill and training mangers identify and store credentialing data for candidates with valid training certifications at 912. At 914, verify that the credentialing candidate's skill and training certifications are validated by, for example, entering the PIN of the candidate for storage via the data store 102. Optionally, at 916, confirm that biometric information exist for the candidate.

Retrieve self reported skills and training credentialing data for validated candidates at 918. Select and manage credentialing classification associated skills of the candidate at 920. Managing credentialing classifications comprises, for example, adding skill categories, skill modules, and skill details to profiles of individual candidates. As another example, managing credentialing classifications comprises, for example, updating skill categories, skill modules, and skill details to profiles of individual candidates. Assign unique identifiers to skill categories, modules, and details (i.e., global ID) at 922.

At 924, a credentialing candidate presents him/herself to a system administrator to receive a credential for an operation that requires a license. The system administrator uses a credentialing terminal interfaced to the data store and/or a third-party information broker to conduct verification of the training skills self-reported or claimed at 926.

According to one aspect, the candidate supplies his or her PIN, and/or optionally a biometric signature, as part of licensure verification. Verification of the skills and training may also include the capture of images of the breeder documents; visual comparison of data from the original breeder documents to information self-reported by the candidate; electronic comparison of the information in the breeder documents with the information self-reported by the candidate by means of optical character recognition; transfer of credentialing candidate's information from the breeder documents and/ or data store to a governmental authority, third-party information broker, or other information resource for the purpose of verifying that the skills and training are valid and without restriction; and/or transfer of credentialing candidate's information from the breeder documents and/or data store to a governmental authority, third-party information broker, or other information resource for the purpose of verifying the skills and training are associated with the identity of the credentialing candidate previously verified (see previous section).

Optionally, the candidate's verified skills and training information is encrypted using a digital certificate or CKM for storage via the credentialing terminal 626 at 928. At 930, the validated candidate is issued a new credential, or an updated credential.

Figure 10:
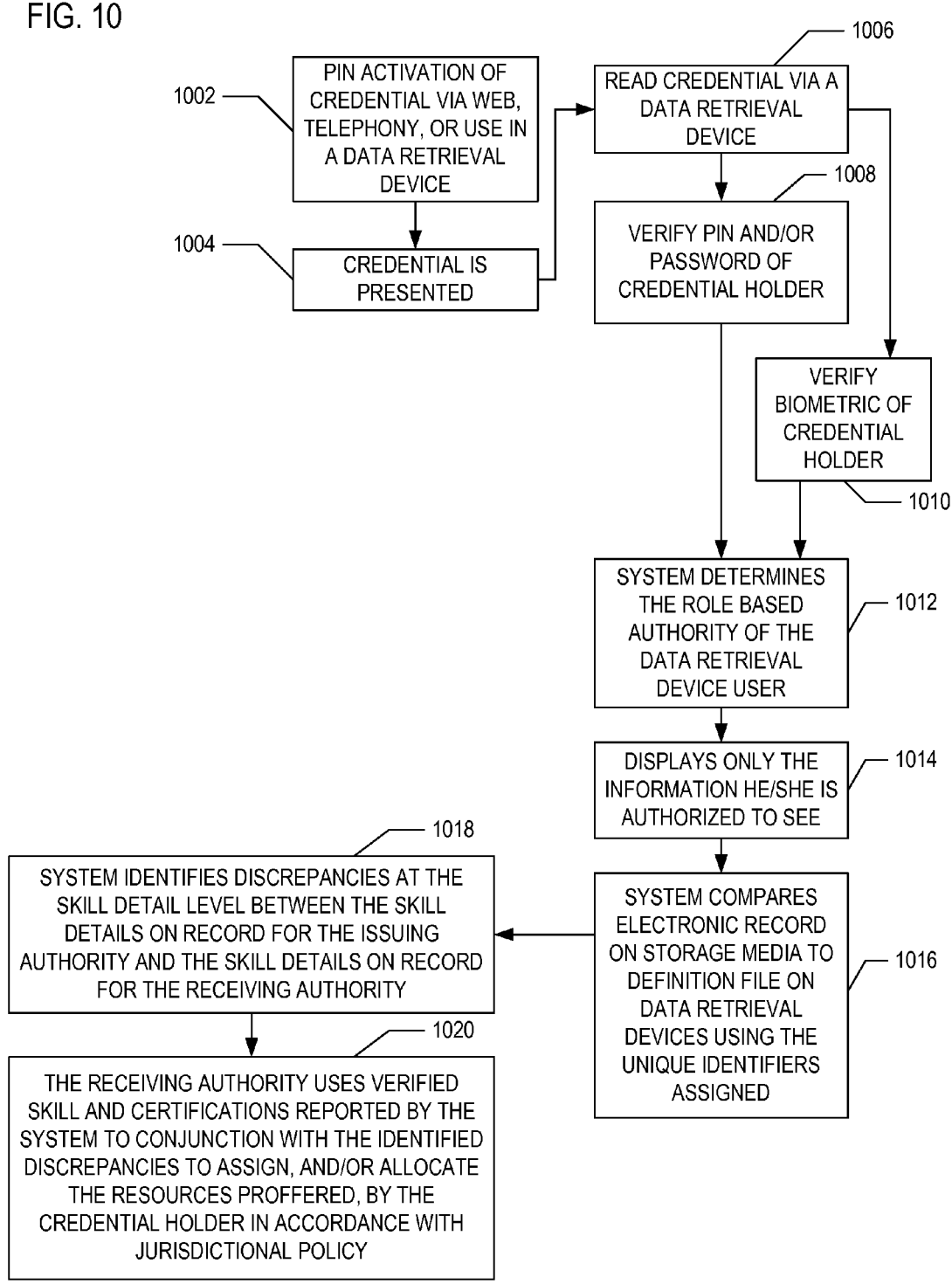

FIG. 10 illustrates an exemplary scenario for a candidate using an issued credential according to an aspect of the credentialing system 100. Once the identity of the credentialing candidate has been established and verified, a token may be issued, or not in the case of a token-less program, and the candidates profile is activated for use. Candidate PIN is activated via Web, telephony, or a data retrieval device (optional) at 1002. The activated credential is presented to an AHJ at 1004. At 1006, the credential is read via a data retrieval device (e.g., credentialing device 626.) The candidate enters identification data, such as a PIN and password, via the data retrieval device at 1008. The identification data may also include biometric data collected, for example, via a biometric scanner.

Optionally, when the candidate does not possess physical credential (e.g., token-less), an associated record is retrieved from the credentialing system for display based on a biometric match at 1010. For example, candidate's fingerprint obtained via the data collection device (e.g., credentialing terminal 626) is used to retrieve the associated record.

At 1012, determine the role-based authority of the data-retrieval device user based on a previous log-in requirement that may use a PIN, password, token, biometric, or any combination thereof. Display only the credentialing data for the candidate that user is authorized to access at 1014.

At 1016, compare an electronic record (i.e., unique identification code) stored on the credential to data included in a definition file stored on the data retrieval device. System identifies discrepancies at the skill detail level between the skill details on record for the issuing authority and the skill details for the receiving authority at 1018. At 1020, the receiving authority assigns and/or allocates the resources proffered by the credential holder based on verified skill and certifications in conjunction with the identified discrepancies.

FIG. 11 illustrates another exemplary scenario for a candidate using an issued credential according to an aspect of the credentialing system 100. Candidate PIN is activated via Web, telephony, or a data retrieval device (optional) at 1102. The activated credential is presented to an AHJ representative at 1104. At 1106, the credential is read via a data retrieval device. The candidate enters identification data, such as a PIN and password, via the data retrieval device to verify the identity of the credential holder at 1108. The identification data may also include biometric data, such as a fingerprint, collected via the data retrieval device.

Optionally, when the candidate does not possess physical credential (e.g., token-less), an associated record is retrieved from the credentialing system for display based on a biometric match at 1110. For example, candidate's fingerprint obtained via the data collection device is used to retrieve the associated record.

At 1112, determine the role-based authority of the data-retrieval device user based on a previous log-in requirement that may use a PIN, password, token, biometric, or any combination thereof. Display only the credentialing data for the candidate that the user is authorized to access at 1112.

At 1116, the system retrieves the medical information and/or force protection screen information from the data storage media of the credential and displays the information on a viewer. The medical information can be verified and/or edited by the data-retrieval device user with the corresponding role-based authority. Critical medical decisions can now be made in an information-rich environment.

In an alternative process, a credential is presented to the AHJ representative, and a dedicated phone number (printed on data storage media) is used to contact system administrators at 1118. System administrators determine the role-based authority, identity, and validity of the requestor (i.e., AHJ representative) and issue a one-time use pass code at 1120.

At 1122, the requestor uses, for example, a Web browser to enter the pass code and interface with the data store 102. The system 100 retrieves the medical information and/or force protection screen information from the data storage media and displays the information on a viewer. Critical medical decisions can now be made in an information-rich environment at 1124.

It is contemplated that the credentialing computing device 106 typically has at least some form of computer readable media 646. Computer readable media 646, which include both volatile and nonvolatile media, removable and non-removable media, may be any available medium that may be accessed by the credentialing computing device 106. By way of example and not limitation, computer readable media 646 comprise computer storage media and communication media. Computer storage media include volatile and nonvolatile, removable and non-removable media implemented in any method or technology for storage of information such as computer readable instructions, data structures, program modules, or other data. For example, computer storage media include RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the credentialing computing device 106. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, FRO, infrared, and other wireless media, are examples of communication media. Combinations of any of the above are also included within the scope of computer readable media.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

The Global Identification Code for Skill Sets

The invention uses a series of Global Identification codes with State Definition File(s) to support the comparison feature (see FIG. 10).

Each individual state has a mirror or duplicate of the Master data store file.

In order to maintain a universal baseline two issues need to be addressed.

a. Every skill Category, Master, Module, and Detail must have a unique identifier. The Identifier cannot be a randomly generated number but must be generated based on a set of rules. The rules for assigning the unique identifier are as follows.
  I. All Skill Category items shall start with the Number 1
  ii. All Skill Master (module) items shall start with the Number 2
  iii. All Skill Detail items shall start with the number 3
  iv. Master Data Store Identifiers shall start with the Prefix US to indicate the Skill set component is National Standards based.
  v. All Fire Service Skills shall have the number 10 as the second and third digits. (Exception: National Fire Academy Programs not covered by NAPA Standards and/or taught by state Fire Academies.)
  vi. All R Special Operations Skills US shall have the number 11 as the second and third digits.
  vii. All EMS Skills shall have the number 13 as the second and third digits.
  viii. All National Fire Academy Instructed and Self Study Fire Service Skills shall have the number 14 as the second and third digits. (Currently considered unique jurisdictional skills)
  ix. All Law Enforcement skills shall have the number 15 as the second and third digits.
  x. All Public Works skills shall have the number 16 as the second and third digits.
  xi. All Public Health skills shall have the number 17 as the second and third digits.
  xii. All Clinical, CME, CUE, RMU, Skills shall have the number 18 as the second and third digits.
  xiii. All Red Cross Skills shall have the number 19 as the second and third digits.
  xiv. All Citizen Corps Skills shall have the number 20 as the second and third digits.
  xv. All Supplemental Medical Skills shall have the number 21 as the second and third digits.
  xvi. All Hazardous Materials Response Skills shall have the number 22 as the second and third digits
  xvii. All Incident Management/Command Skills shall have the number 23 as the second and third digits
  xviii. All Supplemental EMA, FEMA & FEMA Independent Study Program Skills shall have the number 24 as the second and third digits. (Excepting those programs that fall under the NIMS/NRC program categories)
  xix. All Supplemental EMA NETC (National Emergency Training Center) Skills shall have the number 25 as the second and third digits. (Excepting those programs that fall under the NIMS/NRC program categories)

xx. All Supplemental EMA Nobel Training Center Skills shall have the number 26 as the second and third digits. (Excepting those programs that fall under the NIMS/NRC program categories)
xxi. All Supplemental EMA Non-Resident State Delivered Emergency Management Training Programs shall have the number 27 as the second and third digits. (Excepting those programs that fall under the NIMS/NRC program categories)
xxii. All Supplemental EMA FEMA Mount Weather Training Center Skills shall have the number 28 as the second and third digits. (Excepting those programs that fall under the NIMS/NRC program categories)
xxiii. All Supplemental EMA National Emergency Management Training Institute Skills shall have the number 29 as the second and third digits. (Excepting those programs that fall under the NIMS/NRC program categories)
xxiv. All Supplemental EMA American Radio League (AARL) and RACES Skills shall have the number 30 as the second and third digits. (Excepting those programs that fall under the NIMS/NRC program categories)
xxv. All EMA Skill Sets shall have the number 31 as the second and third digits.
xxvi. The numbers 32 through 99 as the second and third digits shall be reserved for future use.
xxvii. The fourth and fifth digits 00-99 shall be reserved for segmenting classification skill sets.
  1. EMS Skill Segment numbers
    a. 1st responder will be 01
    b. EMT-B (basic) will be 02
    c. EMT-I (advanced) will be 03
    d. EMT-P (paramedic) will be 04
  2. Fire Service Segment numbers
    a. NFPA 1001—FFI will be 01
    b. NFPA 1001—FFII will be 02
    c. NFPA 1002—Driver Operator Apparatus equipped with Pump will be 03
    d. NFPA 1002—Driver Operator Apparatus equipped with Aerial Device 04
    e. NFPA 1002—Driver Operator Apparatus equipped with a Tiller will be 05
    f. NFPA 1002—Driver Operator Wild land Fire Apparatus will be 06
    g. NFPA 1002—Driver Operator Aircraft Rescue and Fire Fighting Apparatus will be 07
    h. NFPA 1002—Mobil Water Supply Apparatus will be 08
    i. NFPA 1002—RESERVED FOR FUIURE USE 09
    j. NFPA 1002—RESERVED FOR FUIURE USE 10
    k. NFPA 1002—RESERVED FOR FUIURE USE 11
    l. NFPA 1002—RESERVED FOR FUIURE USE 12
    m. NFPA 1003—Airport Fire Fighter will be 13
    n. NFPA 1003—RESERVED FOR FUIURE USE 14
    o. NFPA 100613 Rope Rescue Operations will be 15
    p. NFPA 1006—Rope Rescue Technician will be 16
    q. NFPA 1006—Confined Space Rescue Operations will be 17
    r. NFPA 1006—Confined Space Rescue Technician will be 18
    s. NFPA 1006—Trench Rescue Operations will be 19
    t. NFPA 1006—Trench Rescue Technician will be 20
    u. NFPA 1006—Structural Collapse Operations will be 21
    v. NFPA 1006—Structural Collapse Technician will be 22
    w. NFPA 1006—Vehicle and Machinery Rescue Operations will be 23
    x. NFPA 1006—Vehicle and Machinery Rescue Technician will be 24
    y. NFPA 1006—Surface Water Rescue Operations will be 25
    z. NFPA 1006—Surface Water Rescue Technician will be 26
    aa. NFPA 100613 Swift Water Rescue Operations will be 27
    bb. NFPA 1006—Swift Water Rescue Technician will be 28
    cc. NFPA 1006—Dive Rescue Operations will be 29
    dd. NFPA 1006—Dive Rescue Technician will be 30
    ee. NFPA 1006—Ice Rescue Operations will be 31
    ff. NFPA 1006—Ice Rescue Technician will be 32
    gg. NFPA 1006—Surf Rescue Operations will be 33
    hh. NFPA 1006—Surf Rescue Technician will be 34
    ii. NFPA 1006—Wilderness Rescue Operations will be 35
    jj. NFPA 1006—Wilderness Rescue Technician will be 36
    kk. NFPA 1006—Mine and Tunnel Rescue Operations 37
    ll. NFPA 1006—Mine and Tunnel Rescue Technician 38
    mm. NFPA 1006—Cave Rescue Operations will be 39
    nn. NFPA 1006—Cave Rescue Technician will be 40
    oo. NFPA 1006—Subterranean Rescue Technician will be 41
    pp. NFPA 1006—RESERVED FOR FUIURE USE 42
    qq. NFPA 1006—RESERVED FOR FUIURE USE 43
    rr. NFPA 1006—RESERVED FOR FUIURE USE 44
    ss. NFPA 1006—RESERVED FOR FUIURE USE 45
    tt. NFPA 1006—RESERVED FOR FUIURE USE 46
    uu. NFPA 1006—RESERVED FOR FUIURE USE 47
    vv. NFPA 1006—RESERVED FOR FUIURE USE 48
    ww. NFPA 1006—RESERVED FOR FUIURE USE 49
    xx. NFPA 1006—RESERVED FOR FUIURE USE 50
    yy. NFPA 1021—Fire Officer I will be 51
    zz. NFPA 1021—Fire Officer II will be 52
    aaa. NFPA 1021—Fire Officer III will be 53
    bbb. NFPA 1021—Fire Officer IV will be 54
    ccc. NFPA 1031—Fire Inspector I will be 55
    ddd. NFPA 1031—Fire Inspector II will be 56
    eee. NFPA 1031—Fire Inspector III will be 57
    fff. NFPA 1031—RESERVED FOR FUIURE USE 58
    ggg. NFPA 1031—Plan Examiner I will be 59
    hhh. NFPA 1031—Plan Examiner II will be 60
    iii. NFPA 1033—Fire Investigator will be 61
    jjj. NFPA 1033—RESERVED FOR FUIURE USE 62
    kkk. NFPA 1035—Public Fire and Life Safety Educator I will be 63
    lll. NFPA 1035—Public Fire and Life Safety Educator II will be 64
    mmm. NFPA 1035—Public Fire and Life Safety Educator III will be 65
    nnn. NFPA 1035—Public Information Officer will be 66 ooo. NFPA 1035—Juvenile Firesetter Intervention Specialist I will be 67
ppp. NFPA 1035—Juvenile Firesetter Intervention Specialist II will be 68
qqq. NFPA 1035—RESERVED FOR FUIURE USE 69
rrr. NFPA 1035—RESERVED FOR FUIURE USE 70
sss. NFPA 1041—Instructor I will be 71
ttt. NFPA 1041—Instructor II will be 72
uuu. NFPA 1041—Instructor III will be 73
vvv. NFPA 1041—RESERVED FOR FUIURE USE 74
www. NFPA 1051—Wildland Firefighter I will be 75
xxx. NFPA 1051—Wildland Firefighter II will be 76
yyy. NFPA 1051—Wildland Fire Officer I will be 77
zzz. NFPA 1051—Wildland Fire Officer II will be 78
aaaa. NFPA 1051—Wildland/Urban Interface Protection Specialist will be 79
bbbb. NFPA 1051—Wildland/Urban Interface Coordinator will be 80
cccc. NFPA 1061—Public Safety Telecommunicator I will be 81
dddd. NFPA 1061—Public Safety Telecommunicator I will be 82
eeee. NFPA 1071—Emergency Vehicle Technician I will be 83
ffff. NFPA 1071—Emergency Vehicle Technician II will be 83
gggg. NFPA 1071—Emergency Vehicle Technician III will be 83
hhhh. FIRE SERVICE SEGMENT NUMBERS 84 THROUGH 99 ARE RESERVED FOR FUIURE USE 3. HAZMAT Skill Segment Numbers
   a. NFPA 472—Awareness Level Hazardous Materials Responder will be 01
   b. NFPA 472—Operations Level Hazardous Materials Responder will be 02
   c. NFPA 472—Operations Level Biological WMD Response will be 03
   d. NFPA 472—Operations Level Chemical WMD Response will be 04
   e. NFPA 472—Operations Level Radiological WMD Response will be 05
   f. NFPA 472—Technician Level Hazardous Materials Responder will be 06
   g. NFPA 472—Technician Level Hazardous Materials Responder—Tank Car Specialty will be 07
   h. NFPA 472—Technician Level Hazardous Materials Responder—Cargo Tank Specialty will be 08
   i. NFPA 472—Technician Level Hazardous Materials Responder—Intermodal Tank Specialty will be 09
   j. NFPA 472—Technician Level Hazardous Materials Responder—Marine Tank Specialty will be 10
   k. NFPA 472—Hazardous Materials Response Incident Commander will be 11
   l. NFPA 472—Hazardous Materials Response Specialist (Unique Agency Skill Set) will be 12
   m. NFPA 472—Hazardous Materials Officer—Branch Director/Group Supervisor will be 13
   n. NFPA 472—Hazardous Materials Safety Officer will be 14
   o. HAZMAT SEGMENT NUMBERS 15 THROUGH 99 ARE RESERVED FOR FUIURE USE 4. Incident Management—Command Skill Segment Numbers
   a. NFPA 1026—Incident Commander will be 01
   b. NFPA 1026—Safety Officer will be 02
   c. NFPA 1026—Public Information Officer will be 03
   d. NFPA 1026—Liaison Officer will be 04
   e. NFPA 1026—Operations Section Chief will be 05
   f. NFPA 1026—Staging Area Manager will be 06
   g. NFPA 1026—Operations Branch Director will be 07
   h. NFPA 1026—Operations Division/Group Supervisor will be 08
   i. NFPA 1026—Strike Team/Task Force Leader will be 09
   j. NFPA 1026—Air Operations Branch Director will be 10
   k. NFPA 1026—Air Support Group Supervisor will be 11
   l. NFPA 1026—Air Tactical Group Supervisor will be 12
   m. NFPA 1026—Planning Section Chief will be 13
   n. NFPA 1026—Resources Unit Leader will be 14
   o. NFPA 1026—Situation Unit Leader will be 15
   p. NFPA 1026—Documentation Unit Leader will be 16
   q. NFPA 1026—Demobilization Unit Leader will be 17
   r. NFPA 1026—Logistics Section Chief will be 18
   s. NFPA 1026—Service Branch Director will be 19
   t. NFPA 1026—Communications Unit Leader will be 20
   u. NFPA 1026—Medical Unit Leader will be 21
   v. NFPA 1026—Food Unit Leader will be 22
   w. NFPA 1026—Support Branch Director will be 23
   x. NFPA 1026—Supply Unit Leader will be 24
   y. NFPA 1026—Facilities Unit Leader will be 25
   z. NFPA 1026—Ground Support Unit Leader will be 26
   aa. NFPA 1026—Finance/Administration Section Chief will be 27
   bb. NFPA 1026—Compensation/Claims Unit Leader will be 28
   cc. NFPA 1026—Cost Unit Leader will be 29
   dd. NFPA 1026—Procurement Unit Leader will be 30
   ee. NFPA 1026—Time Unit Leader will be 31
   ff. INCIDENT COMMAND SEGMENT NUMBERS 32 THROUGH 65 ARE RESERVED FOR FUIURE USE
   gg. FEMA IS—100;—ICS 100 Incident Command System will be 66
   hh. FEAM IS—100FW;—1I00 Incident Command for Federal Disaster Workers will be 67
   ii. FMEA IS-195;—Basic Incident Command will be 68
   jj. FEMA IS-200;—Basic Incident Command for Federal Disaster Workers will be 69
   kk. FEMA IS-700;—National Incident Management System will be 70
   ll. FEMA Q-462;—Introductory All Hazard NIMS ICS for Operational First Responders will be 71
   mm. FEMA Q-463;—Basic All Hazard NIMS ICS for Operational First Responders will be 72
   nn. FEMA W-160/F-163;—NIMS for Emergency Medical Services will be 73
   oo. FEMA W-806/F-806;—NIMS for Fire Service will be 74 pp. FEMA W-796/F-796;—NIMS for Fire Service Train the Trainer will be 75
qq. FEMA E-449;—ICS Train the Trainer will be 76
rr. FEMA G-190; -ICS for Law Enforcement will be 77
ss. FEMA G-191;—ICS Emergency Operations Center Interface will be 78
tt. FEAM G-192;—ICS for Public Works will be 79
uu. FEMA G-195;—Intermediate Incident Command System will be 80
vv. FEMA G-196;—Advanced Incident Command System will be 81
ww. FEMA E-449;—ICS Curricula TTT will be 82
xx. FEMA G-305.7;—Hazardous Materials: Overview of the Incident Command System. will be 83
yy. INCIDENT COMMAND SEGMENT NUMBERS 84 THROUGH 99 ARE RESERVED FOR FUIURE USE 5. For Supplemental Emergency Management Skill Segment Numbers See ANNEX A.
6. Law Enforcement Skill Segment Numbers
   a. Basic Patrol Officer Academy Training will be 01
   b. Basic Correctional Officer Academy Training will be 02
   c. LAW ENFORCEMENT SEGMENT NUMBERS 03 TRHOUGH 10 ARE RESERVED FOR FUIURE USE
   d. Bomb Squad—Explosives Team Supervisor will be 11
   e. Bomb Squad—Explosives Team Technician will be 12
   f. Bomb Squad—Explosives Team Medic will be 13
   g. Pilot, Helicopter—Patrol and Surveillance Type I will be 14
   h. TFO, Helicopter—Patrol and Surveillance Type I will be 15
   i. Pilot, Helicopter—Patrol and Surveillance Type II will be 16
   j. TFO, Helicopter—Patrol and Surveillance Type II will be 17
   k. Pilot, Helicopter—Patrol and Surveillance Type III will be 18
   l. TFO, Helicopter—Patrol and Surveillance Type III will be 19
   m. Pilot, Helicopter—Patrol and Surveillance Type IV will be 20
   n. TFO, Helicopter—Patrol and Surveillance Type IV will be 21
   o. Pilot, Fixed Wing—Observation Type I will be 22
   p. TFO, Helicopter—Observation Type I will be 23
   q. Pilot, Fixed Wing—Observation Type II will be 24
   r. TFO, Helicopter—Observation Type II will be 25
   s. Mobil Field Force (Crowd Control) OIC (Officer in Charge) will be 26
   t. Mobil Field Force (Crowd Control) Deputy OIC will be 27
   u. Mobil Field Force Counter Sniper will be 28
   v. Mobil Field Force Grenadiers will be 29
   w. Mobil Field Force Officer will be 30
   x. NFPA 1006—Public Safety Diver will be 31
   y. NFPA 1016—Public Safety Diver Deep Water (mixed gas) will be 32
   z. UED (underwater explosives and demolition) Diver will be 33
   aa. Special Weapons and Tactics Officer will be 34
   bb. Special Weapons and Tactics Sniper will be 35
   cc. Special Weapons and Tactics Liaison Officer will be 36
   dd. Special Weapons and Tactics Medic will be 37
   ee. Special Weapons and Tactics Electronics Technician will be 38
   ff. Special Weapons and Tactics Intelligence Officer will be 39
   gg. Special Weapons and Tactics Communications Officer will be 40
   hh. Special Weapons and Tactics Explosives and Demolitions Officer will be 41
   ii. Special Weapons and Tactics ROV (remote operated vehicle) Technician will be 42
   jj. K-9 Officer will be 43
   kk. K-9 Officer, Explosives Team Specialist will be 44
   ll. K-9 Officer, Special Weapons and Tactics Specialist will be 45
   mm. K-9 Officer, Crowd Control Specialist (Mobil Field Force) will be 46
   nn. K-9 Officer, Narcotics Specialist will be 47
   oo. K-9 Officer, Cadaver Search Specialist will be 48
   pp. K-9 Officer, Search and Rescue Specialist will be 49
   qq. Motorcycle Patrol Officer will be 50
   rr. Mounted (Equestrian) Patrol Officer will be 51
   ss. Crime scene photographer will be 52
   tt. DARE Officer will be 53
   uu. School Resource Officer will be 54
   vv. Rape Investigator will be 55
   ww. PR-24 Instructor will be 56
   xx. Cult, Occult and Satanic Crime Investigation will be 57
   yy. Field Training Officer will be 58
   zz. Supervisory Training (NCO) will be 59
   aaa. Command Officer Training will be 60
   bbb. Advanced Accident Investigation will be 61
   ccc. Motor Vehicle Accident Re-Construction. will be 62 xxviii. The sixth, seventh and eighth characters 000-999 will be added sequentially as skills are added to the master system
xxix. An example of the format is 31013005. Addition number five 31046005; to the skill detail group 310465; in the Fire Service category 31046005, Segment (Airport Firefighter) 31013005,
   b. Any Skill Category, Module, or Detail added to a state specific data store by a Client administrator shall have the two character State code as its prefix.
   2.) A function script allows all state data stores to be updated from the master data store so that Master Skill sets can be edited one time and all child (state) data stores updated. The updates shall NOT affect any Skill Category, Skill Master (module), or Skill Detail that starts with a two character state code prefix.
   3.) Each state data store will be the "parent" used to create that states definition file. The definition file will be stored in the handheld devices and thick client applications. The purpose of a definition file is two fold;
      a. to translate coded items on the cards to text that the users can understand them.
      b. to identify discrepancies in skill set information between an out of state card holder and the definition file used by that state, or an out of area card holder (specific to law enforcement) and the definition file used by that state.

4.) The function of the definition file can be illustrated in the following manner (see FIG. 10).
   a. The Master Data store Contains skills details which for illustrative purposes are coded
      i. 31002003,
      ii. 31002004,
      iii. 31002006,
   b. A Massachusetts Card Holders card is encoded with skills
      i. 31002004,
      ii. 31002006,
      iii. 31002007,
      iv. Skill 31002003, was marked as deleted (hidden) by a Massachusetts Administrator, as the skill is not required in that state.
      v. MA31002007 (the MA prefix indicates the skill detail "31002007" was added by Massachusetts Administrators
      vi. These same skills are in the Massachusetts definition file
   c. A Virginia Card Holder's card is encoded with skills
      i. 31002003,
      ii. 31002004,
      iii. 31002006,
      vii. These same skills are in the Virginia definition file
   d. When a Massachusetts card is read by a device with a Virginia definition file the system will ask the following questions: Where is Skill 31002003? And what is Skill MA31002007? The resulting report in the data retrieval device will display the text definition for 31002003 and MA31002007, with a marker indicating that the Massachusetts card holder is not in possession of those skills a required skill in Virginia and that the responder has skills beyond those required in Virginia.
   e. When a Virginia card is read by a device with a Massachusetts definition file, the system will ask the following questions: What is skill 31002003? And Where is skill MA31002007?

The resulting report in the thick client will display the text definition for 31002003 and MA31002007, the first of which are in the Virginia definition file the second will reference the Massachusetts definition file or if the file is not available display a message on the data retrieval device that an additional non required skill exists in the credential holders profile.

The explanation should start with ADDITIONAL SKILL If connectivity exists the thick client should pull the definition of an ADDITIONAL SKILL from the Card Holders (state) data store. If connectivity does not exist the Indicator "information not available" should be used.

The invention claimed is:

1. A system for collecting credentialing data for a plurality of agencies, each of the plurality of agencies providing an emergency response service, the system comprising: a data store configured to store credentialing data; a first computing device configured to generate a data entry request in response to input from a first user;
   wherein the first user is an administrator of at least one of the plurality of agencies;
   a second computing device configured to generate an enrollment data entry request in response to input from a second user;
   wherein the second user comprises a particular emergency responder;
   a third computing device comprising executable modules stored thereon, the executable modules comprising: a UI module configured to:
   generate a first input form for display via the first computing device in response to the data entry request; and
   generate a second input form for display via the second computing device in response to the enrollment data entry request;
   a storage module configured to transfer first credentialing data included in a storage request received from the first computing device to the data store for storage; and
   a verification module configured to compare the first credentialing data to second credentialing data included in an enrollment request received from the second computing device to determine whether the second user is eligible for enrollment;
   wherein the verification module transfers the second credentialing data to the data store when the second user is determined to be an eligible user; and
   wherein the verification module deletes the second credentialing data when the second user is determined to be an ineligible user.

2. The system of claim 1, wherein the first user is selected from a group consisting of a program manager, an identity verifier, a license validator, and a skill and training certification manager.

3. The system of claim 1, wherein the credentialing data comprises administrative data for a plurality of emergency responders, the administrative data comprising documents and images of identity data, license data, and skill and training certification data.

4. The system of claim 1 wherein:
   the second credentialing data comprises personal data for the particular emergency responder, the personal data comprising name data, residence address data, mailing address data, driver's license data, social security number data, telephone number data, descriptive data, biographic data, medical data, and demographic data.

5. The system of claim 4 wherein the first credentialing data comprises a prefilled sponsor list, the prefilled sponsor list comprising a list of eligible second users, and wherein the verification module compares the name data to the list of eligible second users to determine if the particular emergency responder is the eligible user.

6. The system of claim 1 wherein the data store comprises administrator profile data, the administrator profile data defining an authority level of administrators within each of the plurality of agencies, and wherein the third computing device further comprises an authentication module configured to verify that the first user has an appropriate authority level before transferring the first credentialing data to the data store, and wherein the storage module only transfers the first credentialing data to the data store when the first user is verified to have the appropriate authority level.

7. The system of claim 1 wherein:
   the first user interacts with the first input form via the first computing device to generate the storage request; and
   the second user interacts with the second input form via the second computing device to generate the enrollment request.

8. A method for collecting credentialing data for a plurality of agencies via a credentialing system, each of the plurality of agencies providing an emergency response service, the method comprising:
   storing credentialing data via a data store;
   generating a data entry request at a first computing device in response to input from a first user;

wherein the first user is an administrator of at least one of the plurality of agencies;

generate an enrollment data entry request at a second computing device in response to input from a second user;

wherein the second user comprises a particular emergency responder;

generating a first input form for display via the first computing device in response to the data entry request;

generating a second input form for display via the second computing device in response to the enrollment request;

receiving a storage request at the third computing device, the storage request comprising first credentialing data;

receiving an enrollment request at the third computing device, the enrollment request comprising second credentialing data;

comparing the first credentialing data to the second credentialing data to determine whether the second user is eligible for enrollment;

transferring the first credentialing data included in a storage request received from the first computing device to the data store for storage when the second user is determined to be an eligible user; and deleting the second credentialing data when the second user is determined to be an ineligible user.

9. The method of claim 8, wherein the first user is selected from a group consisting of a program manager, an identity verifier, a license validator, and a skill and training certification manager.

10. The method of claim 8, wherein the credentialing data comprises administrative data for a plurality of emergency responders, the administrative data comprising documents and images of identity data, license data, and skill and training certification data.

11. The method of claim 8 wherein:

the second credentialing data comprises personal data for the particular emergency responder, the personal data comprising name data, residence address data, mailing address data, driver's license data, social security number data, telephone number data, descriptive data, biographic data, and demographic data.

12. The method of claim 11 wherein the first credentialing data comprises a prefilled sponsor list, the prefilled sponsor list comprising a list of eligible second users, and wherein the method further comprises comparing the name data to the list of eligible second users to determine if the particular emergency responder is the eligible user.

13. The method of claim 8 wherein the data store comprises administrator profile data, the administrator profile data defining an authority level of administrators within each of the plurality of agencies, and wherein the method further comprises verifying that the first user has an appropriate authority level before transferring the first credentialing data to the data store, and wherein the first credentialing data is transferred to the data store only when the first user is verified to have the appropriate authority level.

14. The method of claim 8 further comprising:

generating the storage request in response to the first user interacting with the first input form via the first computing device; and generating the enrollment request in response to the second user interacting with the second input form via the second computing device.

* * * * *